United States Patent
Kaneko et al.

(12)

(10) Patent No.: US 7,067,587 B2
(45) Date of Patent: *Jun. 27, 2006

(54) POLYOLEFIN MACROMONOMER, GRAFT POLYMER OBTAINED FROM THE POLYOLEFIN MACROMONOMER, AND USE THEREOF

(75) Inventors: Hideyuki Kaneko, Sodegaura (JP); Shin-ichi Kojoh, Sodegaura (JP); Nobuo Kawahara, Sodegaura (JP); Shingo Matsuo, Sodegaura (JP); Tomoaki Matsugi, Sodegaura (JP); Junji Saito, Sodegaura (JP); Sadahiko Matsuura, Sodegaura (JP); Kazuhisa Miyazaki, Sodegaura (JP); Norio Kashiwa, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/650,919

(22) Filed: Aug. 29, 2003

(65) Prior Publication Data

US 2004/0242791 A1    Dec. 2, 2004

(30) Foreign Application Priority Data

Aug. 30, 2002    (JP) ............................. 2002-254839

(51) Int. Cl.
  *C08F 4/42* (2006.01)
  *C08F 110/06* (2006.01)
  *C08F 297/06* (2006.01)
  *C08G 63/91* (2006.01)

(52) U.S. Cl. .................. 525/245; 525/242; 525/69; 526/114; 526/351

(58) Field of Classification Search ............... 525/69, 525/245, 327.7, 242, 333.7; 526/351, 114
See application file for complete search history.

(56) References Cited

U.S. PATENT DOCUMENTS

| | | | | |
|---|---|---|---|---|
| 5,856,611 A * | 1/1999 | Schlaefer et al. | ............ | 585/520 |
| 6,306,963 B1 * | 10/2001 | Lane et al. | ............ | 525/68 |
| 6,423,793 B1 * | 7/2002 | Weng et al. | ............ | 526/114 |
| 6,573,352 B1 * | 6/2003 | Tatsumi et al. | ............ | 526/351 |
| 2004/0220346 A1 * | 11/2004 | Kaneko et al. | ............ | 525/242 |

FOREIGN PATENT DOCUMENTS

| | | |
|---|---|---|
| JP | 06-329720 A | 11/1994 |
| JP | 08-176354 A | 7/1996 |
| JP | 08-176415 A | 7/1996 |

OTHER PUBLICATIONS

Sung Chul Hong et al.; Journal of Polymer Science: Part A; Polymer Chemistry, vol. 40, pp. 2736-2749, 2002.
Thomas Duschek et al.; Polym. Prepr., vol. 33, pp. 170-171, 1992.

* cited by examiner

*Primary Examiner*—James J. Seidleck
*Assistant Examiner*—Olga Asinovsky
(74) *Attorney, Agent, or Firm*—Birch, Stewart, Kolasch & Birch, LLP

(57) ABSTRACT

A novel graft polymer useful in various uses that has a polyolefin backbone having polyolefin segments excellent in moldability can be obtained by homopolymerizing a novel polyolefin macromonomer or polymerizing the novel polyolefin macromonomer in the coexistence of other olefins depending on need, wherein the macromonomer has at the terminal of its polyolefin chain a vinyl group whose α-position may be substituted, and the macromonomer can be efficiently obtained by a method, for example, successively carrying out i) a step of producing a polyolefin having a hydroxyl group at the terminal of the polyolefin chain and ii) a step of converting the terminal hydroxyl group of the polyolefin in chain into an acryloyl group, a methacryloyl group or a styryl group.

8 Claims, 3 Drawing Sheets

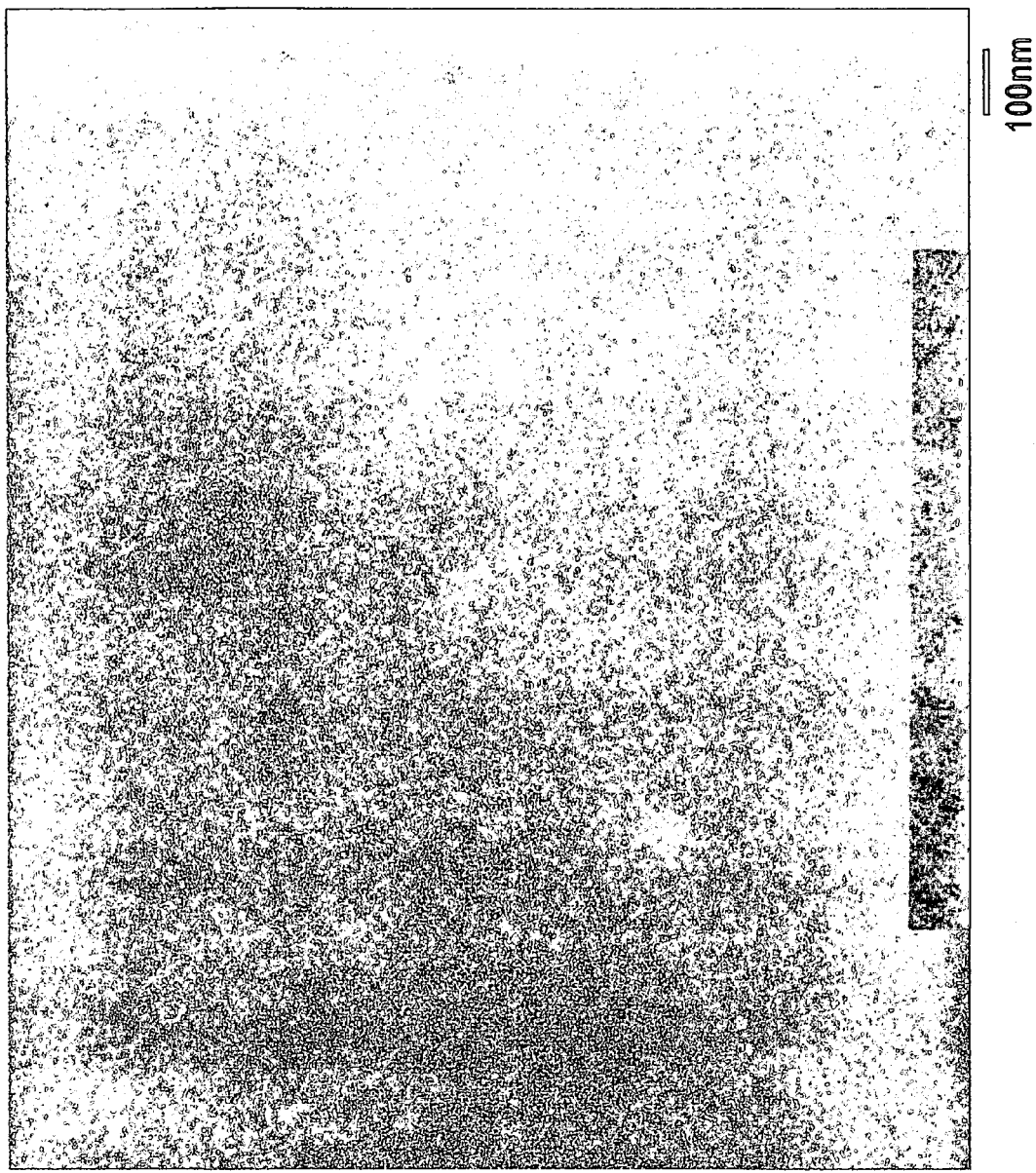
Fig. 1. TEM image of the graft polymer (PMMA-g-EPR) obtained in Example 11.

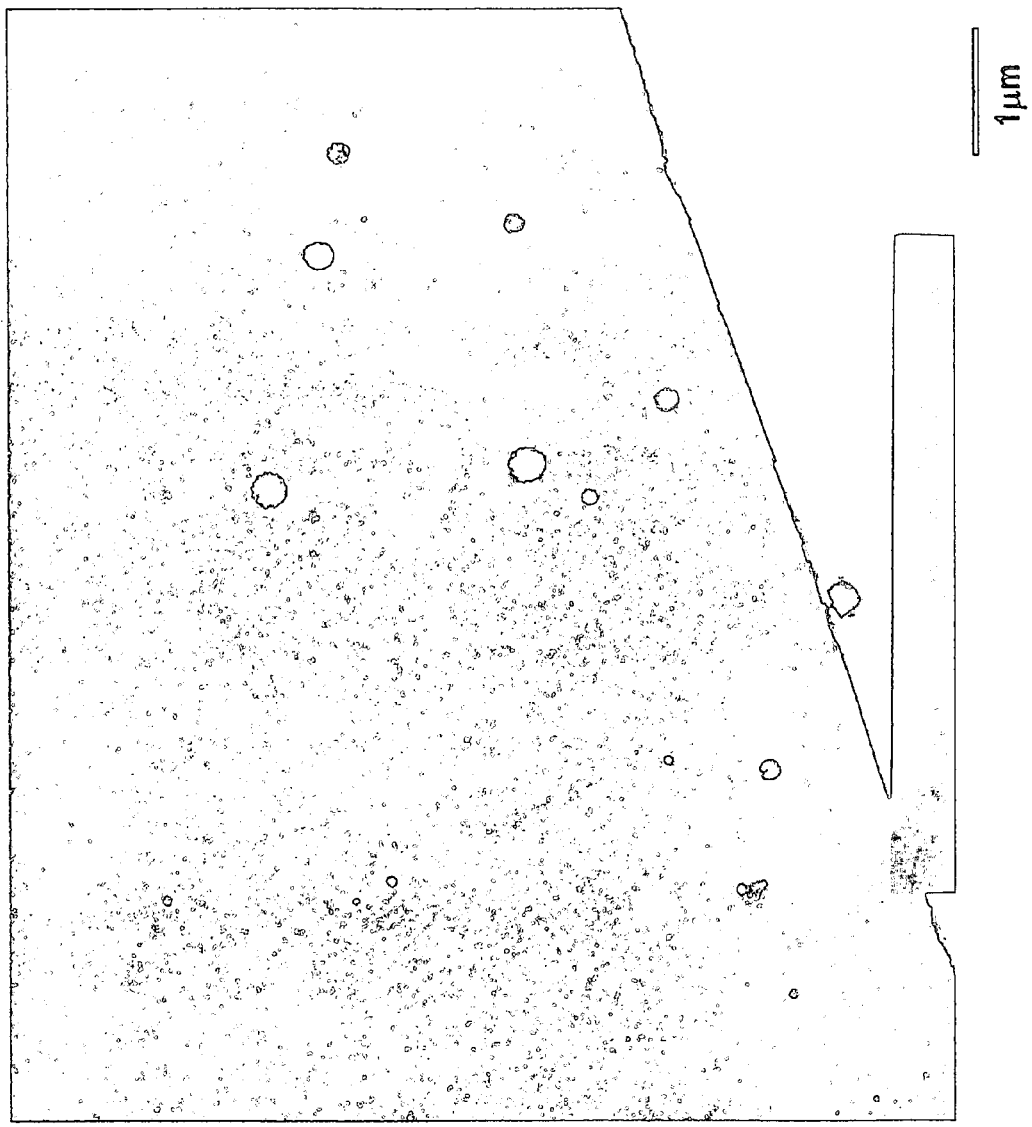
Fig. 2. TEM image of the polymer (PMMA/EPR blend) prepared in Reference Example 1 (white region, PMMA; black region, EPR)

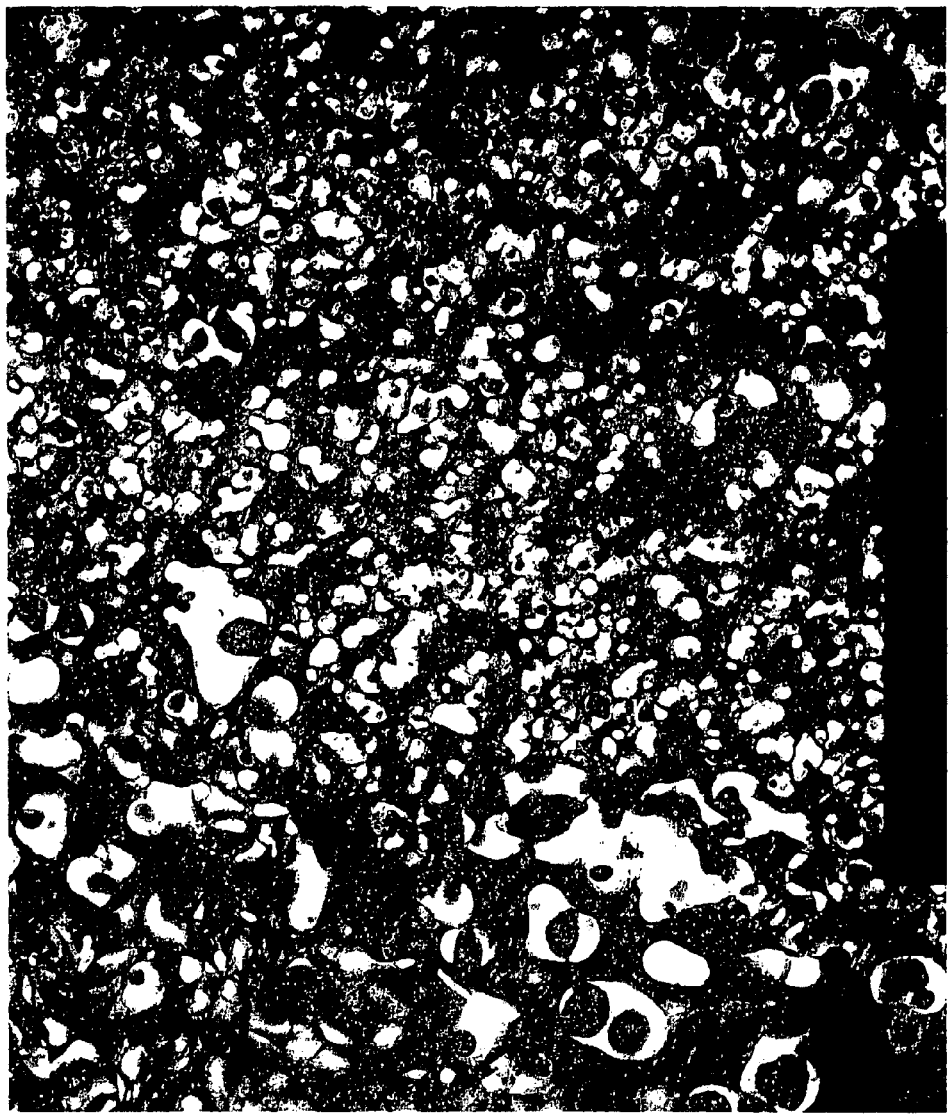
Fig. 3. TEM image of the polymer (PMMA/EPR blend plus 10% PMMA-g-EPR) prepared in Example 12 (white region, PMMA; black region, EPR)

POLYOLEFIN MACROMONOMER, GRAFT POLYMER OBTAINED FROM THE POLYOLEFIN MACROMONOMER, AND USE THEREOF

This nonprovisional application claims priority under 35 U.S.C. § 119(a) on Patent Application No. 2002-254839 filed in Japan on Aug. 30, 2002, which is herein incorporated by reference.

TECHNICAL FIELD

The present invention relates to a polyolefin macromonomer, a process for producing the same, a graft polymer obtained from the polyolefin macromonomer, and use thereof.

BACKGROUND ART

Polyolefin such as polyethylene (PE), polypropylene (PP) etc. are characterized by not only being lightweight and inexpensive but also having excellent physical properties and processability, but high performance represented by printability, coating ability, heat resistance, impact resistance and compatibility with other polar polymers cannot be realized due to the high chemical stability of polyolefin. For compensating for this disadvantage and endowing the polyolefin with above-mentioned functions, a method of copolymerizing an olefin with a polar monomer such as vinyl acetate or methacrylate by radical polymerization and a method of grafting a polar monomer such as maleic anhydride onto polyolefin in the presence of a peroxide are known. In these methods, however, the structure of a polyolefin moiety in the resulting polymer is hardly accurately regulated, thus making it insufficient to maintain excellent physical properties inherent in the polyolefin.

A means of producing a polymer having a polyolefin moiety whose structure is accurately regulated and having functions not exhibited by polyolefin only, there can be anticipated a method wherein a polyolefin macromonomer having a polymerizable vinyl bond at the terminal thereof is homopolymerized or copolymerized with various vinyl monomers having functional groups thereby converting the monomer into a graft polymer having polyolefin side chains. As the method of producing a polyolefin macromonomer to synthesize a graft polymer, for example, JP-A 6-329720 describes a method wherein a polymerizable acryloyl or methacryloyl group is introduced into the terminal of polyethylene synthesized by living polymerization. JP-A 8-176354 and JP-A 8-176415 disclose a method of introducing a polymerizable styryl group into the terminal of a polypropylene polymer synthesized by living polymerization. According to a method described in J. Polym. Sci., Part A, 40, 2736 (2002), a polyethylene macromonomer having a methacryloyl group at a polymerization initiation terminal is obtained by living polymerization with a Ni catalyst into which a methacryloyl group was introduced.

In the methods using living polymerization, only one polymer is obtained from one active site on catalyst, and the molecular weight distribution (Mw/Mn) of polyolefin is about 1. However, it goes without saying that the number of polymers obtained from one active site on catalyst is preferably higher from productive viewpoint, and also that the molecular weight distribution (Mw/Mn) of polyolefin is greater for moldability of the polymer. Accordingly, the method utilizing the living polymerization is inadequate, in general, for industrial mass production of polyolefins from economical viewpoint. Further, the method described in JP-A 6-329720 supra makes use of anion polymerization using alkyl lithium, and thus polyolefin producible as a macromonomer is polyethylene with a relatively low molecular weight, that is, a 1000-mer at the maximum, and the method described in JP-A 8-176354 supra makes use of a vanadium compound having a specific structure as an olefin polymerization catalyst, and thus the type of producible polyolefin is limited to a polypropylene polymer.

Further, Polym. Prepr., 33, 170 (1992) discloses a method wherein a low molecular weight polypropylene obtained by a metallocene catalyst is used as a macromonomer, but the number-average molecular weight (Mn) of polypropylene used is as low as 800 to 1000, and from the viewpoint of production of a novel graft polymer having excellent physical properties as polyolefin as one object of the present invention, the macromonomer described in this prior art literature is insufficient for exhibiting excellent property of polypropylene segment, that is, high crystallizability, high rigidity and high heat resistance.

Under these circumstances, the present inventors made extensive examination to develop a polyolefin macromonomer excellent in productivity, consisting of various α-olefin homopolymers or copolymers and capable of covering a broad molecular weight range, and as a result, they found that polyolefin in having a hydroxyl group introduced into the terminal thereof is produced by a coordination polymerization catalyst containing a transition metal compound represented by a solid-state titanium catalyst or a metallocene catalyst used widely in industry as a catalyst for production of polyolefin, and by a method of converting the hydroxyl group into an acryloyl group, a methacryloyl group or a styryl group or by polymerizing a polyolefin macromonomer obtained by such a method, a novel graft polymer useful in various uses can be obtained, thus arriving at the present invention.

SUMMARY OF THE INVENTION

Hereinafter, the polyolefin macromonomer of the invention, a graft polymer obtained from the polyolefin macromonomer, and uses thereof are described.

The polyolefin macromonomer (MM) according to the present invention is a polyolefin macromonomer composed of a polyolefin chain (P), a vinyl group (X) which may be substituted at the α-position and a linking group (Z) for connecting both, represented by formula (I):

$$P\text{-}Z\text{-}X \qquad (I)$$

wherein P is a polymer chain having a molecular weight distribution (Mw/Mn) equal to or more than 1.5 (provided that when P is a propylene homopolymer residue, the number-average molecular weight is 1000 or more) obtained by homopolymerizing or copolymerizing olefins in the presence of a coordination polymerization catalyst containing a transition metal compound, said olefins being represented by $CH_2=CHR^1$ wherein $R^1$ is a hydrocarbon group having 1 to 20 carbon atoms, a hydrogen atom or a halogen atom, X is a vinyl group which maybe substituted at the α-position thereof, represented by $-CH(R^2)=CH_2$ whereupon $R^2$ represents a hydrogen atom or a methyl group, and Z is an ester group (B1) or a phenylene group (B2) having a chemical bond containing a group selected from a carboxylate group, an amide group, an ether group and a carbamate group. An ether oxygen atom in (B1) is covalently bound to the polyolefin chain (P).

The first preferable polyolefin macromonomer according to the present invention is a polyolefin macromonomer (MM-1) obtained by successively conducting steps (A) and (B):

Step (A): A step of producing polyolefin in having a hydroxyl group at the terminal of a polyolefin chain (P), represented by formula (II):

P—OH    (II)

wherein P has the same meaning as defined for P in the formula (I).

Step (B): A step of converting a terminal hydroxyl group in the polyolefin chain (P) obtained in the step (A) into an acryloyl group or a methacryloyl group.

The second preferable polyolefin in macromonomer according to the present invention is a polyolefin macromonomer (MM-2) obtained by successively conducting steps (A') and (B'):

Step (A'): A step of producing polyolefin having an unsaturated bond at the terminal of a low molecular weight polymer P', represented by formula (III):

P'—U    (III)

wherein P' is a polymer having 10 to 2000 carbon atoms and consisted of constitutional units derived from ethylene only or ethylene and an α-olefin having 3 to 10 carbon atoms, wherein the unit derived from ethylene is 20 to 100 mol %, and the unit derived from α-olefin is 0 to 80 mol %, and U represents a vinyl group or a vinylidene group.

Step (B'): A step of converting a terminal vinyl or vinylidene group in the low molecular weight polymer P' obtained in the step (A') into an acryloyl group or a methacryloyl group.

The third preferable polyolefin macromonomer according to the present invention is a polyolefin macromonomer (MM-3) obtained by reacting a styrene derivative represented by formula (IV):

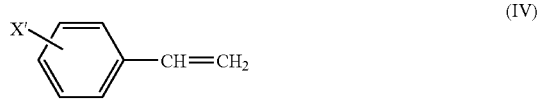

(IV)

wherein X' is a group containing a group selected from a halogen atom, a hydroxyl group, a carboxyl group, an acid halide group, an epoxy group, an amino group and an isocyanate group, with a functional group-containing polyolefin represented by formula (V):

P—Y    (V)

wherein P is the same as in the formula (I), and Y is a functional group selected from a hydroxyl group, an amino group, an epoxy group, a carboxyl group, an acid halide group and an acid anhydride group.

The graft polymer (GP) according to the present invention is a homopolymer of the polyolefin macromonomer (MM) or a copolymer of the polyolefin in macromonomer (MM) and at least one monomer (CM) selected from organic compounds each having at least one carbon-carbon unsaturated bond.

The graft polymer (GP) according to the present invention can be obtained by polymerizing the polyolefin macromonomer (MM) alone or a combination of the polyolefin macromonomer (MM) and at least one monomer (CM) selected from organic compounds each having at least one carbon-carbon unsaturated bond by radical polymerization, anion polymerization, coordination polymerization or the like.

The thermoplastic resin composition according to the present invention comprises the graft polymer (GP), and is used in various uses.

The present invention relates to a film, a sheet, an adhesive resin, a compatibilizer, a resin modifier, a filler dispersant or a dispersed system being comprised of the graft polymer.

Further, the present invention relates to a film, a sheet, an adhesive resin, a compatibilizer, a resin modifier, a filler dispersant or a dispersed system being comprised of the thermoplastic resin composition.

BRIEF DESCRIPTION OF THE DRAWINGS

FIG. 1 is an image by a transmission electron microscope (TEM) of the graft polymer obtained in Example 11.

FIG. 2 is an image by a transmission electron microscope (TEM) of the graft polymer obtained in Reference Example 1.

FIG. 3 is an image by a transmission electron microscope (TEM) of the graft polymer obtained in Example 12.

BEST MODE FOR CARRYING OUT THE INVENTION

The best mode of the polyolefin macromonomer (MM) of the present invention, a graft polymer (GP) obtained from the polyolefin macromonomer and uses thereof are described in more detail.

[1] Polyolefin Macromonomer (MM)

The polyolefin macromonomer (MM) according to the present invention is a polyolefin macromonomer composed of a polyolefin in chain (P), a vinyl group (X) which may be substituted at the α-position, and a linking group (Z) for connecting both, represented by formula (I):

P-Z-X    (I)

Hereinafter, the polyolefin chain (P), the vinyl group (X) which may be substituted at the α-position, and the linking group (Z) for connecting both are described.

[1—1] Polyolefin Chain (P)

The polyolefin chain (P) in the formula (I) represents a residue of polyolefin (P-H wherein P is a polyolefin chain, and H is a hydrogen atom) obtained by (co)polymerizing one or more olefins represented by formula (VI) below in the presence of a coordination polymerization catalyst containing compounds of the groups 4 to 11 transition metals in the periodic table. For example, the polyolefin residue in the case where ethylene polymerization proceeds ideally without forming a branched chain is represented by $CH_3—(CH_2)_n—$.

$CH_2=CHR^1$    (VI)

wherein $R^1$ represents a Hydrocarbon group having 1 to 20 carbon atoms, a hydrogen atom or a halogen atom.

The hydrocarbon group having 1 to 20 carbon atoms includes, for example, a methyl group, ethyl group, propyl group, butyl group, pentyl group, hexyl group, octyl group, decyl group etc. The olefins represented by the formula (VI) above include, for example, linear or branched α-olefins having 4 to 20 carbon atoms such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicocene; and vinyl halides such as vinyl chloride and vinyl bromide. Preferably used among these exemplified olefins are one or more olefins selected from ethylene, propylene, 1-butene, 1-hexene and 1-octene, particularly preferably ethylene only, propylene only, both propylene and ethylene, both ethylene and 1-butene, or both propylene and 1-butene, which are (co)polymerized to prepare the polyolefin chain.

The molecular weight distribution of the polyolefin in chain (P) is substantially equal to that of its corresponding polyolefin in (P-H), and the molecular weight distribution (Mw/Mn) is usually 1.5 or more. Mw is a weight-average molecular weight determined by gel permeation chromatography (GPC), and Mn is a number-average molecular weight determined by GPC. From the viewpoint of moldability of a graft polymer derived from the macromonomer (MM) of the present invention and a resin composition containing the graft polymer, the molecular weight distribution is usually 1.5 or more, preferably 1.8 or more, particularly preferably 2.0 or more.

The number-average molecular weight of the polyolefin chain (P) is substantially equal to that of its corresponding polyolefin (P-H), and from the viewpoint of balance among usefulness in physical properties of a graft polymer derived from the macromonomer (MM) of the present invention and a polyolefin segment in a resin composition containing the graft polymer, polymerizability of the macromonomer (MM) and reactivity at the time of production of the macromonomer (MM), the number-average molecular weight is usually in the range of 200 to 10,000,000, preferably 500 to 1,000,000, particularly preferably 500 to 500,000. However, when P is a propylene homopolymer residue, the weight-average molecular weight is 1000 or more from the viewpoint of usefulness in physical properties, particularly crystallizability, rigidity and heat resistance of a graft polymer derived from the macromonomer (MM) of the present invention and a polyolefin segment in a resin composition containing the graft polymer.

[1-2] Vinyl Group which may be Substituted at the α-position

In the formula (I), X is a vinyl group which may be substituted at the a-position, represented by formula (VII):

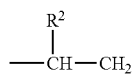

(VII)

In the formula (VII), $R^2$ represents a hydrogen atom or a methyl group. In the present invention, therefore, the vinyl group (X) which may be substituted at the α-position is limited to a vinyl group or a vinylidene group.

[1-3] Linking Group (Z)

Z is an ester group (B1), or a phenylene group (B2) represented by formula (VIII):

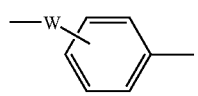

(VIII)

In the formula (VIII), W is a group containing a group (Gr) selected from a carboxylate group, an amide group, an ether group, and a carbamate. Specifically, the group (W) includes ether linkage-containing groups such as —O—CH$_2$—, —O—(CH$_2$)$_2$—, —O—(CH$_2$)$_3$—, —O—CH(CH$_3$)—CH$_2$—, —O—CH$_2$—CH(CH$_3$)—, —O—(CH$_2$)$_4$—, —O—CH$_2$—CH(OH)—, —O—CH$_2$—CH(OH)—CH$_2$—, —O—CH$_2$—CH(OH)—(CH$_2$)$_2$—, —O—CH$_2$—CH(OH)—(CH$_2$)$_3$—, —O—CH$_2$—CH(OH)—(CH$_2$)$_4$—, —O—CH$_2$—CH(OH)—CH$_2$—O—CH$_2$—, —O—CH(CH$_2$OH)—, —O—CH(CH$_2$OH)—CH$_2$—, —O—CH(CH$_2$OH)—(CH$_2$)$_2$—, —O—CH(CH$_2$OH)—(CH$_2$)$_3$—, —O—CH(CH$_2$OH)—(CH$_2$)$_4$—, —O—CH(CH$_2$OH)—CH$_2$—O—CH$_2$—, —CH(OH)—CH$_2$—O—, —CH(OH)—CH$_2$—O—CH$_2$—, —CH(OH)—CH$_2$—O—(CH$_2$)$_2$—, —CH(OH)—CH$_2$—O—(CH$_2$)$_3$—, —CH(OH)—CH$_2$—O—(CH$_2$)$_4$—, —CH(CH$_2$OH)—O—, —CH(CH$_2$OH)—O—CH$_2$—, —CH(CH$_2$OH)—O—(CH$_2$)$_2$—, —CH(CH$_2$OH)—O—(CH$_2$)$_3$— and —CH(CH$_2$OH)—O—(CH$_2$)$_4$—, carboxylate group-containing groups such as —(CO)O—, —(CO)O—CH$_2$—, —(CO)O—(CH$_2$)$_2$—, —(CO)O—(CH$_2$)$_3$—, —(CO)O—(CH$_2$)$_4$—, —O(CO)—, —O(CO)—CH$_2$—, —O(CO)—(CH$_2$)$_2$—, —O(CO)—(CH$_2$)$_3$—, —O(CO)—(CH$_2$)$_4$—, —(CO)O(CO)—, —(CO)O(CO)—CH$_2$—, —(CO)O(CO)—(CH$_2$)$_2$—, —(CO)O(CO)—(CH$_2$)$_3$—, —(CO)O(CO)—(CH$_2$)$_4$—, —C(COOH)—CH$_2$—(CO)O—, —C(COOH)—CH$_2$—(CO)O—CH$_2$—, —C(COOH)—CH$_2$—(CO)O—(CH$_2$)$_2$—, —C(COOH)—CH$_2$—(CO)O—(CH$_2$)$_3$—, —C(CH$_2$COOH)—(CO)O—, —C(CH$_2$COOH)—(CO)O—CH$_2$—, —C(CH$_2$COOH)—(CO)O—(CH$_2$)$_2$— and —C(CH$_2$COOH)—(CO)O—(CH$_2$)$_3$—, amide group-containing groups such as —NH(CO)—, —NH(CO)—CH$_2$—, —NH(CO)—(CH$_2$)$_2$—, —NH(CO)—(CH$_2$)$_3$—, —NH(CO)—(CH$_2$)$_4$—, —(CO)NH—, —(CO)NH—CH$_2$—, —(CO)NH—(CH$_2$)$_2$—, —(CO)NH—(CH$_2$)$_3$— and —(CO)NH—(CH$_2$)$_4$—, and carbaminate group-containing groups such as —O(CO)NH—, —O(CO)NH—CH$_2$—, —O(CO)NH—(CH$_2$)$_2$—, —O(CO)NH—(CH$_2$)$_3$— and —O(CO)NH—(CH$_2$)$_4$—.

Among these phenylene groups (B2), the following groups are used preferably from the viewpoint of high reactivity and easy handling in production.

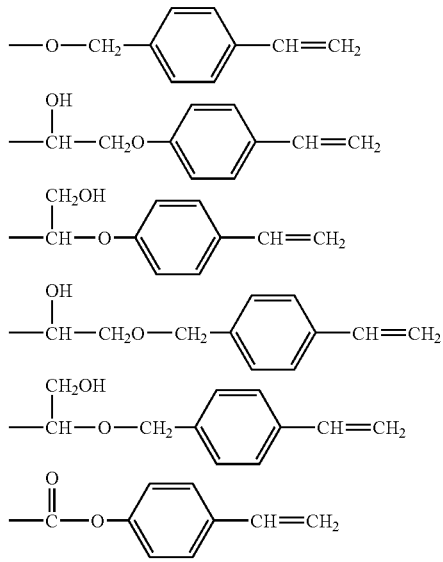

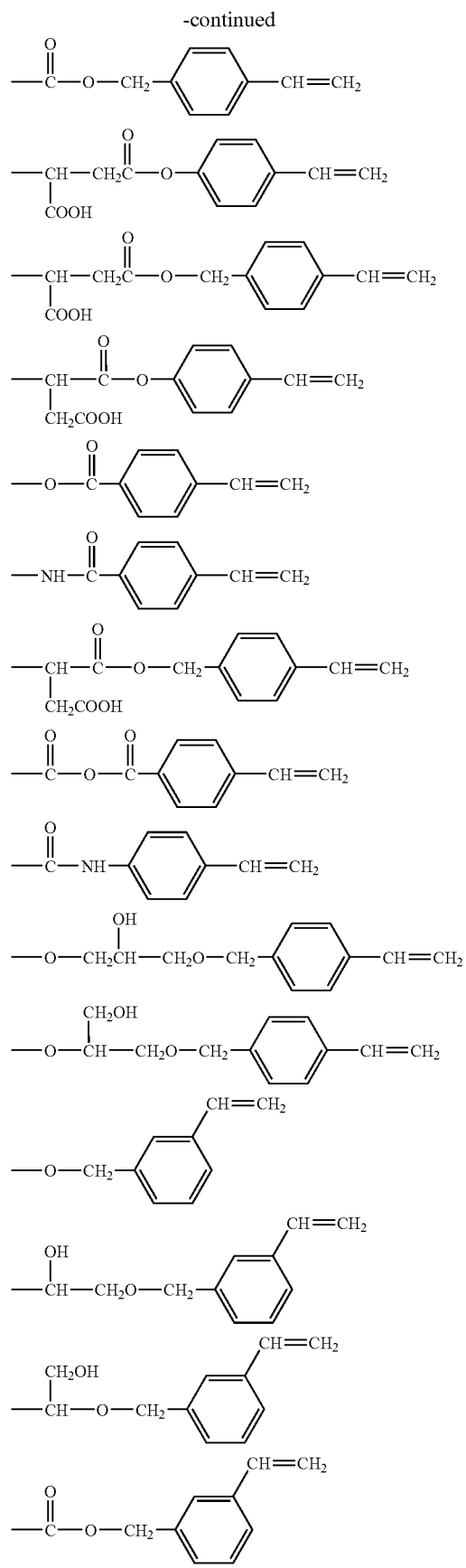
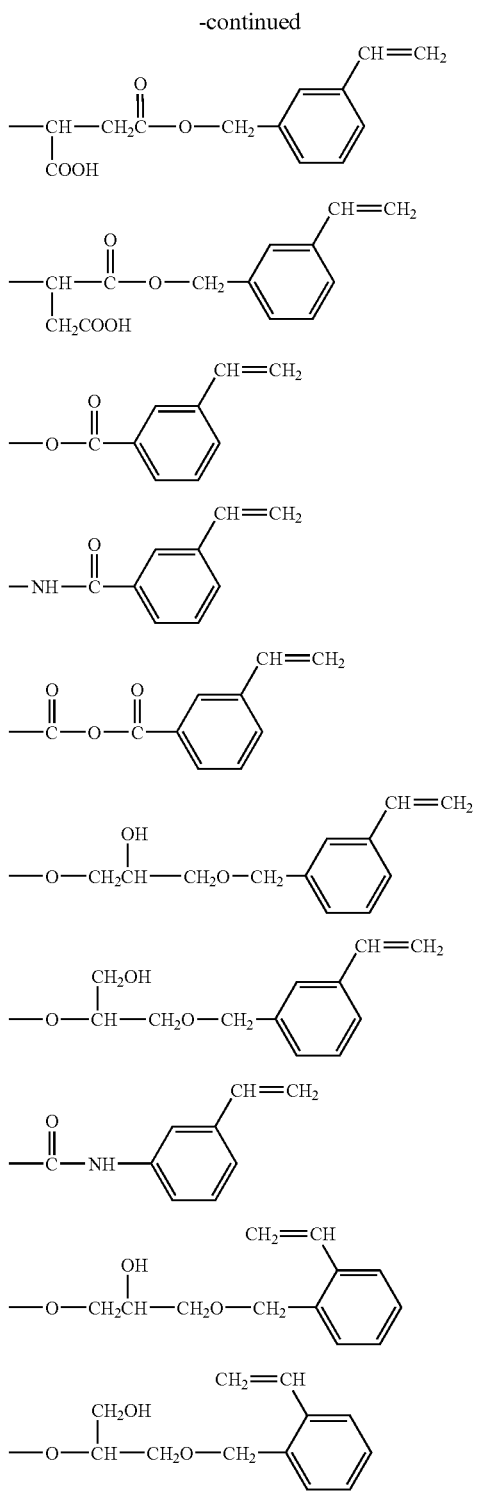
[2] Preferable Polyolefin Macromonomer
Among the polyolefin in macromonomers (MM) in the present invention, three kinds of macromonomers (MM-1), (MM-2) and (MM-3) are preferable in respect of easy production and polymerizability of the polyolefin macromonomers. Hereinafter, these preferable polyolefin macromonomers are described in more detail.

[2-1] Polyolefin Macromonomer (MM-1)

The polyolefin macromonomer (MM-1) is a polyolefin macromonomer obtained by successively conducting the following steps (A) and (B):

Step (A): A step of producing polyolefin in having a hydroxyl group at the terminal of a polyolefin chain (P), represented by formula (II):

P—OH    (II)

wherein P has the same meaning as defined for P in the formula (I).

Step (B): A step of converting the terminal hydroxyl group in the polyolefin chain (P) obtained in the step (A) into an acryloyl group or a methacryloyl group.

Now, each step is described.

Step (A)

The polyolefin having a hydroxyl group at the terminal of the polyolefin chain P, represented by the formula (II) above, can be produced for example by producing polyolefin modified at a terminal position thereof (also referred to hereinafter as "polyolefin modified at the terminal thereof") in the presence of an olefin polymerization catalyst, then subjecting a terminal group in the polyolefin modified at the terminal thereof to substitution reaction with a compound having a functional group structure, and subjecting the product to solvolysis, or by subjecting a terminal group in the polyolefin in modified at the terminal thereof to substitution reaction with a compound giving a structure which upon solvolysis, forms a functional group, and subjecting the product to solvolysis.

Hereinafter, the process of the present invention is divided into production of the polyolefin modified at the terminal thereof and conversion of the polyolefin modified at the terminal into the polyolefin in having a hydroxyl group at the terminal represented by the formula (II).

<<Production of the Polyolefin Modified at the Terminal thereof>>

The polyolefin modified at the terminal thereof has a structure represented by e.g. formula (IX):

P—AlR$^3$R$^4$    (IX)

wherein P has the same meaning as defined for P in the formula (I) or (II).

The method of producing the polyolefin modified at the terminal thereof represented by the formula (IX) is roughly divided into:

(Method 1), that is, a method of polymerizing an olefin in the presence of an olefin polymerization catalyst containing a compound (α) containing the group 13 element in the periodic table, and (Method 2), that is, a method of producing the polyolefin modified at the terminal by reacting polyolefin having an unsaturated bond at the terminal thereof (also called "polyolefin unsaturated at the terminal thereof") with a compound (β) containing the group 13 element in the periodic table. The modified terminal group (—AlR$^3$R$^4$) in the formula (IX) is a terminal group obtained by using an organoaluminum compound as the compound (α) or (β) containing the group 13 element in the periodic table. Usually, R$^3$ and R$^4$ may be the same or different and each represent a Hydrocarbon group having 1 to 20 carbon atoms, a hydrogen atom or a halogen atom. Now, (Method 1) is described, and (Method 2) is described later.

In the above-mentioned (Method 1), the olefin polymerization catalyst used in production of the polyolefin modified at the terminal may be any catalyst known in the art. The catalyst known in the art includes, for example, titanium catalysts carrying magnesium described in e.g. EP0641807A, metallocene catalysts described in e.g. EP250601A, and post-metallocene catalysts containing transition metal complexes described in literatures 1) to 5) below. As the compound containing the group 13 element in the periodic table to constitute the polyolefin polymerization catalyst, it is possible to those compounds disclosed in the above-mentioned EP publications without limitation, but organoaluminum compounds or organoboron compounds are preferably used.

1) M. Brookhart et al., J. Am. Chem. Soc., 117, 6414 (1995)
2) D. H. McConville et al., Macromolecules, 29, 5241 (1996)
3) R. H. Grubbs et al., organometallics, 17, 3149 (1998)
4) EP874005A As the post-metallocene catalyst, a compound (x) having phenoxy imine skeleton represented by formula (X) below, disclosed in EP874005A, is preferably used.

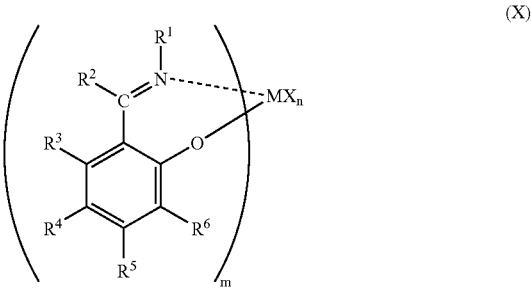

wherein M represents a transition metal atom selected from the groups 3 to 11 metals in the periodic table; k is an integer of 1 to 6; m is an integer of 1 to 6; R$^1$ to R$^6$ are the same or different and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, among which 2 or more groups may be bound to each other to form a ring; when m is 2 or more, R$^1$ groups, R$^2$ groups, R$^3$ groups, R$^4$ groups, R$^5$ groups, or R$^6$ groups may be the same or different, one group of R$^1$ to R$^6$ contained in one ligand and one group of R$^1$ to R$^6$ contained in another ligand may form a linking group or a single bond, and a heteroatom contained in R$^1$ to R$^6$ may coordinate with or bind to M; n is a number satisfying the valence of M; X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group; when n is 2 or more, a plurality of groups represented by X may be the same or different, and a plurality of groups represented by X may be mutually bound to form a ring.

The polyolefin modified at the terminal thereof represented by the formula (IX) is produced by a solvent suspension polymerization method or by a suspension polymerization method using a liquid olefin as solvent. When the solvent suspension polymerization is carried out, a hydrocarbon inert to the polymerization reaction can be used as the polymerization solvent. Examples of such inert hydrocarbon solvents include aliphatic hydrocarbons such as propane, butane, pentane, hexane, heptane, octane, decane, dodecane and petroleum; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene, and a combination thereof. Among these, aliphatic hydrocarbons are particularly preferably used.

When the magnesium-supported titanium catalyst system is used, a solid titanium catalyst component (a) or its preliminary polymerization catalyst in the polymerization system is used usually in an amount of about 0.0001 to 50 mmol, preferably about 0.001 to 10 mmol in terms of titanium atom per L of the polymerization volume. An organometallic compound catalyst component (b) is used in such an amount that the metal atom in the organometallic compound catalyst component (b) is usually in an amount of 1 to 2000 moles, preferably 2 to 1000 moles, per mole of titanium atom in the solid titanium catalyst component (a) in the polymerization system. An electron donor is used usually in an amount of 0.001 to 10 moles, preferably 0.01 to 5 moles, per mole of metal atom in the organometallic compound catalyst component (b).

When the metallocene catalyst is used as the catalyst, the concentration of a metallocene compound (c) in the polymerization system is usually 0.00005 to 0.1 mmol, preferably 0.0001 to 0.05 mmol, per L of the polymerization volume. An organoaluminum oxy compound (d) is used in an amount of 5 to 1000, preferably 10 to 400, in terms of molar ratio (Al/M) of aluminum atom (Al) to transition metal atom (M) in the metallocene compound (c). When an organoaluminum compound (b-2) is used, it is used usually in an amount of about 1 to 300 moles, preferably about 2 to 200 moles, per mole of transition metal atom in the metallocene compound (c).

The hydrogen concentration in the polymerization process is 0 to 0.01 mole, preferably 0 to 0.005 mole, still more preferably 0 to 0.001 mole, per mole of the monomer. The olefin polymerization can be carried out by liquid-phase polymerization such as solution polymerization or suspension polymerization or by gaseous-phase polymerization. The reaction solvent used in suspension polymerization can be the above-mentioned inert solvents, or olefins that are liquid at the reaction temperature. The polymerization temperature is usually in the range of $-50°$ C. to $200°$ C., preferably in the range of $-30$ to $150°$ C., more preferably 0 to $140°$ C., still more preferably 20 to $130°$ C., and the pressure is usually normal pressure to 10 MPa, preferably normal pressure to 5 MPa. The polymerization can be carried out in a batch system, a semi-continuous system or a continuous system, and when the polymerization is conducted in two or more divided stages, the reaction conditions may be the same or different.

When the phenoxy imine catalyst is used as the catalyst, at least one compound selected from, for example, a transition metal compound (x) containing a ligand having a phenoxy imine skeleton represented by the formula (VI), an organoaluminum oxy compound (d), and a compound forming an ion pair by reacting with the phenoxy imine compound can be used. If necessary, the compound (x) supported on a particulate carrier (e) can also be used. When olefins are polymerized by using the polymerization catalyst, the phenoxy imine compound (x) is used usually in an amount of $10^{-12}$ to $10^{-2}$ mole, preferably $10^{-10}$ to $10^{-3}$ mole, per L of the reaction volume.

The temperature for polymerization of olefins by using the olefin polymerization catalyst is usually in the range of $-50$ to $+200°$ C., preferably 0 to $170°$ C. The polymerization pressure is usually normal pressure to 100 kg/cm$^2$, preferably normal pressure to 50 kg/cm$^2$, and the polymerization reaction can also be carried out in a batch system, a semi-continuous system or a continuous system. Further, the polymerization can be carried out in two or more divided stages.

<<Production of Polyolefin in (II) Having a Terminal Hydroxyl Group>>

The thus produced polyolefin modified at the terminal thereof represented by the formula (IX) is obtained usually as slurry. Then, (1) the —AlR$^3$R$^4$ group in the resulting polyolefin modified at the terminal is subjected to substitution reaction with a compound having a functional group structure and then subjected to solvolysis, or (2) the —AlR$^3$R$^4$ group in the resulting polyolefin modified at the terminal is subjected to substitution reaction with a compound having a structure which upon solvolysis, forms a functional group and then subjected to solvolysis, to produce polyolefin having a hydroxyl group at the terminal thereof, represented by formula (II):

$$P\text{—}OH \qquad (II)$$

wherein P has the same meaning as defined above. The compound having a functional group structure includes a halogen gas, methyl chloroformate and phthalic chloride. The compound having a structure which upon solvolysis, forms a functional group includes oxygen, carbon monoxide and carbon dioxide.

The substitution reaction of the —AlR$^3$R$^4$ group in the resulting polyolefin modified at the terminal with the compound having a functional group structure or the compound having a structure which upon solvolysis, forms a functional group is carried out usually at a temperature of 0 to $300°$ C., preferably 10 to $200°$ C., for 0 to 100 hours, preferably 0.5 to 50 hours. After the substitution reaction is carried out, the solvolysis temperature is usually a temperature of 0 to $100°$ C., preferably 10 to $80°$ C., and the solvolysis time is 0 to 100 hours, preferably 0.5 to 50 hours. The solvent used in solvolysis includes methanol, ethanol, propanol, butanol, water etc.

The above-mentioned (Method 2) is a method of producing the polyolefin (II) having a hydroxyl group at the terminal by reacting polyolefin in having an unsaturated bond at one terminal thereof (also referred to in the following description as "polyolefin unsaturated at one terminal thereof") with the compound containing the group 13 element, for example an organoaluminum compound or an organoboron compound, to form polyolefin modified at one terminal thereof represented by the formula (IX), and then converting the terminal into a hydroxyl group in the same manner as described above.

The polyolefin unsaturated at one terminal thereof is produced by using the same olefin and the same olefin polymerization catalyst under the same polymerization conditions as in production of the polyolefin chain (P).

The polyolefin unsaturated at one terminal thereof obtained in this manner is reacted with the compound containing the group 13 element, to convert the terminal into a terminal having the group 13 element bound thereto. When the resulting polyolefin is a mixture of the polyolefin having the group 13 element bound to one terminal thereof and the polyolefin having an unsaturated bond at one terminal thereof, the unsaturated bond at one terminal of the polyolefin can be converted into a terminal having the group 13 element bound thereto.

The compound containing the group 13 element, used in the reaction, can be exemplified as an organoaluminum compound or an organoboron compound, and this compound is particularly preferably trialkyl aluminum, dialkyl aluminum hydride or a boron compound having one or more hydrogen-boron bonds, and particularly preferably the organoaluminum is dialkyl aluminum hydride and the organoboron compound is 9-borabicyclo[3,3,1] nonane.

The reaction of the polyolefin unsaturated at one terminal thereof with the compound containing the group 13 element is carried out for example in the following manner.

i) 0.1 to 50 g polypropylene having a vinylidene group at the terminal and 5 to 1000 ml of 0.01 to 5 moles/L diisobutyl aluminum hydride in octane are mixed and refluxed for 0.5 to 6 hours.

ii) 0.1 to 50 g polypropylene having a vinylidene group at the terminal, 5 to 1000 ml anhydrous tetrahydrofuran, and 0.1 to 50 ml of 0.05 to 10 moles/L 9-borabicyclo[3.3.1] nonane in tetrahydrofuran are mixed and stirred at 20 to 65° C. for 0.5 to 24 hours.

Using the polyolefin unsaturated at the terminal as a starting material, the polyolefin modified at the terminal represented by the formula (IX) is produced in the manner described above. One terminal of the resulting polyolefin in has the group 13 element bound thereto, and the group 13 element is preferably aluminum.

The polyolefin in having a hydroxyl group at the terminal, represented by the formula (II), can also be produced by copolymerizing the same olefin as the olefin used in production of the polyolefin chain (P), with an olefin having a hydroxyl group, in the presence of the coordination polymerization catalyst containing a transition metal compound used in production of the polyolefin chain (P). The method of selectively introducing the olefin having a hydroxyl group into the terminal of the polymer includes, for example, a method described in J. Am. Chem. Soc., 124, 1176 (2002).

The olefin having a hydroxyl group used in copolymerization include, for example, unsaturated alcohols having a linear hydrocarbon moiety, such as allyl alcohol, 4-penten-1-ol, 5-hexen-1-ol, 6-hepten-1-ol, 8-nonen-1-ol and 10-undecen-1-ol.

Step (B)

The polyolefin macromonomer (MM) having an acryloyl group or a methacryloyl group at the terminal thereof, represented by the formula (I), is obtained by reacting the polyolefin having a hydroxyl group at the terminal thereof, represented by the formula (II), with acryloyl halide, methacryloyl halide, acrylic acid, or methacrylic acid.

The method of reacting the polyolefin in having a hydroxyl group at the terminal with acryloyl halide, methacryloyl halide, acrylic acid, or methacrylic acid can be carried out by any known methods without limitation, for example by:

i) a method of reacting the polyolefin having a hydroxyl group at the terminal with acryloyl halide or methacryloyl halide such as acrylic acid chloride, methacrylic acid chloride etc. in the presence of a base such as triethylamine, or ii) a method of reacting the polyolefin in having a hydroxyl group at the terminal with acrylic acid or methacrylic acid in the presence of an acid catalyst.

In the reaction, acryloyl halidemethacryloyl halide, acrylic acid or methacrylic acid is used in the range of 0.1 to 1000 moles, preferably 0.2 to 500 moles, per mole of the hydroxyl group at the terminal of the polyolefin. The reaction temperature is usually −100 to 150° C., preferably 0 to 120° C., and the reaction time is usually 0.1 to 48 hours, preferably 0.5 to 12 hours.

Among the polyolefin macromonomers represented by the formula (I), the polyolefin having an acryloyl group or a methacryloyl group at the terminal thereof, that is, the polyolefin macromonomer (MM-1) represented by formula (I-a) below is produced. In the formula (I-a), P and $R^2$ have the same meaning as defined above.

(I-a)

[2-2] Polyolefin Macromonomer (MM-2)

The polyolefin macromonomer (MM-2) is a polyolefin macromonomer obtained by successively conducting the following steps (A') and (B').

Step (A') is a step of producing polyolefin having an unsaturated bond at the terminal of a low-molecular polymer P', represented by formula (III):

(III)

wherein P' is a polymer having 10 to 2000 carbon atoms and consisted of constitutional units derived from ethylene only or ethylene and a α-olefin having 3 to 10 carbon atoms, wherein the unit derived from ethylene is 20 to 100 mol %, and the unit derived from α-olefin is 0 to 80 mol %, and U represents a vinyl group or a vinylidene group.

The polyolefin having an unsaturated bond at the terminal can be produced by the method described in the method (Method 2) of producing the polyolefin in having a hydroxyl group at the terminal.

Step (B') is a step of converting an unsaturated bond at the terminal of the low-molecular polymer P' obtained in the step (A') into an acryloyl group or a methacryloyl group.

The polyolefin macromonomer (II) is obtained by reacting the polyolefin having a vinyl group or a vinylidene group at the terminal, represented by the formula (III), with acrylic acid or methacrylic acid.

The reaction of the polyolefin having a vinyl group or a vinylidene group at the terminal, represented by the formula (III), with acrylic acid or methacrylic acid is carried out, for example, by reacting the polyolefin having a vinyl group or a vinylidene group at the terminal with acrylic acid or methacrylic acid in the presence of an inorganic acid catalyst such as hydrochloric acid or sulfuric acid or an organic acid catalyst such as p-toluenesulfonic acid, methanesulfonic acid or trifluoromethanesulfonic acid.

In the reaction, acrylic acid or methacrylic acid is used in the range of 0.1 to 1000 moles, preferably 0.2 to 500 moles, per mole of the vinyl group and vinylidene group at the terminal of the polyolefin. The reaction temperature is usually −100 to 200° C., preferably 0 to 150° C., and the reaction time is usually 0.1 to 48 hours, preferably 0.5 to 24 hours.

The polyolefin in having an acryloyl group or a methacryloyl group at the terminal, represented by the formula (I), that is, the polyolefin macromonomer (MM-2) represented by formula (1-b) below, is produced in this manner. In the formula (I-b) below, P' and $R^2$ are as described above, and V is an alkyl bond derived from a vinyl group or vinylidene group represented by U in the formula (III), and V is specifically —CH(CH₃)—, —CH₂CH₂—, —C(CH₃)₂— or —CH(CH₃)—CH₂—.

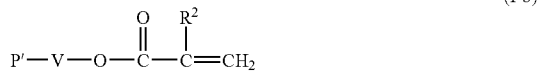

(I-b)

[2-3] Polyolefin Macromonomer (MM-3)

The polyolefin macromonomer (MM-3) is a polyolefin macromonomer (MM-3) obtained by reacting a styrene derivative represented by formula (IV):

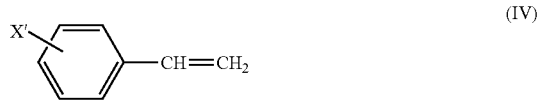

(IV)

wherein X' is a group having a functional group selected from a halogen atom, a hydroxyl group, a carboxyl group, an acid halide group, an epoxy group, an amino group and an isocyanate group, with polyolefin containing a functional group represented by formula (V):

(V)

wherein P is the same as in formula (I), and Y is a functional group selected from a hydroxyl group, an amino group, an epoxy group, a carboxyl group, an acid halide group, and an acid anhydride group.

Hereinafter, the polyolefin macromonomer (MM-3) is described in more detail.

Examples of styrene derivatives represented by the formula (IV) include, for example, halogen-containing styrene derivatives such as m-chlorostyrene, p-chlorostyrene, m-bromostyrene, p-bromostyrene, m-iodostyrene, p-iodostyrene, m-(chloromethyl)styrene, p-(chloromethyl)styrene, m-(bromomethyl)styrene, p-(bromomethyl)styrene, m-(iodomethyl)styrene, p-(iodomethyl)styrene, p-(2-chloroethyl)styrene, p-(2-bromoethyl)styrene, p-(3-chloropropyl)styrene, p-(3-bromopentyl)styrene, p-(4-chlorobutyl)styrene, p-(4-bromobutyl)styrene, p-(5-chloropentyl)styrene, p-(5-bromopentyl)styrene, p-(6-chlorohexyl)styrene and p-(6-bromohexyl)styrene, hydroxyl group-containing styrene derivatives such as m-hydroxystyrene, p-hydroxystyrene, m-hydroxymethylstyrene, p-hydroxymethylstyrene, p-(2-hydroxyethyl)styrene, p-(3-hydroxypropyl)styrene and p-(4-hydroxybutyl)styrene, carboxyl group-containing styrene derivatives such as 3-vinylbenzoic acid, 4-vinylbenzoic acid, (3-vinylphenyl) acetic acid, (4-vinylphenyl) acetic acid, 3-(4-vinylphenyl) propionic acid, 4-(4-vinylphenyl) butanoic acid, 5-(4-vinylphenyl) pentanoic acid and 6-(4-vinylphenyl) hexanoic acid, acid halide group-containing styrene derivatives such as 3-vinylbenzoic acid chloride, 4-vinylbenzoic acid chloride, 3-vinylbenzoic acid bromide, 4-vinylbenzoic acid bromide, 3-vinylbenzoic acid iodide, 4-vinylbenzoic acid iodide, (3-vinylphenyl)acetic acid chloride, (4-vinylphenyl)acetic acid chloride, 3-(4-vinylphenyl) propionic acid chloride, 4-(4-vinylphenyl)butanoic acid chloride, 5-(4-vinylphenyl)pentanoic acid chloride and 6-(4-vinylphenyl)hexanoic acid chloride, amino group-containing styrene derivatives such as 3-vinyl aniline, 4-vinyl aniline, 3-vinyl benzyl amine, 4-vinyl benzyl amine, 2-(4-vinylphenyl) ethylamine, 3-(4-vinylphenyl) propyl amine, 4-(4-vinylphenyl)butyl amine and 5-(4-vinylphenyl)pentyl amine, epoxy group-containing styrene derivatives such as glycidyl-(3-vinylbenzyl) ether and glycidyl-(4-vinylbenzyl) ether, and isocyanate group-containing styrene derivatives such as 3-isocyanatestyrene, 4-isocyanatestyrene, 3-isocyanatemethylstyrene, 4-isocyanatemethylstyrene, 4-(2-isocyanateethyl) styrene, 4-(3-isocyanatepropyl) styrene and 4-(4-isocyanatebutyl) styrene.

The polyolefin in containing a functional group represented by the formula (V) can be produced for example by producing the polyolefin in having a group containing the group 13 element in the periodic table, described in the step A for the polyolefin macromonomer (MM-1), and then converting it by method a or b below into the polyolefin represented by the formula (II) wherein Y in the formula (V) is a hydroxyl group.

(Method a) wherein a group containing the group 13 element in the periodic table, present in the polyolefin, is subjected to substitution reaction with the compound having a functional group structure and then subjected to solvolysis, or (Method b) wherein a group containing the group 13 element in the periodic table, present in the polyolefin, is subjected to substitution reaction with the compound having a structure which upon solvolysis, forms a functional group, and then subjected to solvolysis.

The polyolefin having a functional group represented by the formula (V) wherein Y is an epoxy group can also be produced according to a method described in e.g. JP-A 63-305104 by epoxylating the unsaturated bond in the polyolefin in unsaturated at the terminal produced by the above method. Specifically, the polyolefin in having a functional group can be produced by reacting the polyolefin in unsaturated at the terminal produced by the above-described method with 1) a mixture of an organic acid such as formic acid or acetic acid and hydrogen peroxide or 2) an organic peroxide such as m-chloroperbenzoic acid.

The polyolefin in having a functional group represented by the formula (V) wherein Y is an acid anhydride group can be produced by introducing an acid anhydride into the terminal of the polyolefin unsaturated at the terminal represented by the formula (III) by thermally reacting the terminal with e.g. maleic anhydride according to a method described in e.g. Makromol. Chem. Macromol. Symp., 48/49, 317 (1991) or Polymer, 43, 6351 (2002).

Further the polyolefin having a functional group represented by the formula (V) wherein Y is a carboxyl group can be produced according to a method of the polyolefin having a hydroxyl group represented by the formula (II) to convert the hydroxyl group into a carboxyl group.

The polyolefin having a functional group at the terminal thereof represented by the formula (V) can also be produced by copolymerizing the same olefin as used in production of the polyolefin chain (P) with an olefin having a functional group in the presence of the coordination polymerization catalyst containing a transition metal compound used in production of the polyolefin chain (P). The method of selectively introducing the olefin having a functional group into the terminal of the polymer includes, for example, a method described in J. Am. Chem. Soc., 124, 1176 (2002).

The olefin having a functional group used in copolymerization includes unsaturated alcohols having a liner hydrocarbon moiety, such as allyl alcohol, 4-penten-1-ol, 5-hexen-1-ol, 6-hepten-1-ol, 8-nonen-1-ol and 10-undecen-1-ol, unsaturated carboxylic acids such as 5-hexenoic acid, 6-heptenoic acid, 7-octenoic acid, 8-nonenoic acid and 9-decenoic acid, unsaturated amines such as allyl amine, 5-hexene amine and 6-heptene amine, (2,7-octadienyl)succinic anhydride, pentapropenyl succinic anhydride, unsaturated acid anhydrides wherein in the above unsaturated carboxylic acids, carboxylic acid groups are replaced by carboxylic anhydride groups, unsaturated carboxylic acid halides wherein in the above unsaturated carboxylic acids, carboxylic acid groups are replaced by carboxylic acid halides, and unsaturated epoxy compounds such as 4-epoxy-1-butene, 5-epoxy-1-pentene, 6-epoxy-1-hexene, 7-epoxy-1-heptene, 8-epoxy-1-octene, 9-epoxy-1-nonene, 10-epoxy-1-decene and 11-epoxy-1-undecene.

The combination of the styrene derivative represented by the formula (IV) and the polyolefin having a functional group represented by the formula (V) in producing the polyolefin macromonomer (MM-3) having a styryl group at the terminal of polyolefin chain P includes, but is not limited to, the following combinations:

(C1) The styrene derivative represented by the formula (IV) wherein X' is a group containing a carboxyl group and the polyolefin having a terminal functional group represented by the formula (V) wherein Y is a hydroxyl group.
(C2) The styrene derivative represented by the formula (IV) wherein X' is a group containing a carboxyl group and the polyolefin having a terminal functional group represented by the formula (V) wherein Y is an amino group.
(C3) The styrene derivative represented by the formula (IV) wherein X' is a group containing a hydroxyl group and the polyolefin having a terminal functional group represented by the formula (V) wherein Y is an epoxy group.
(C4) The styrene derivative represented by the formula (IV) wherein X' is a group containing a hydroxyl group and the polyolefin having a terminal functional group represented by the formula (V) wherein Y is a carboxyl group.
(C5) The styrene derivative represented by the formula (IV) wherein X' is a group containing a hydroxyl group and the polyolefin having a terminal functional group represented by the formula (5) wherein Y is an acid anhydride group.
(C6) The styrene derivative represented by the formula (IV) wherein X' is a group containing a hydroxyl group and the polyolefin having a terminal functional group represented by the formula (V) wherein Y is an acid halide group.
(C7) The styrene derivative represented by the formula (IV) wherein X' is a group containing an acid halide group and the polyolefin having a terminal functional group represented by the formula (V) wherein Y is a hydroxyl group.
(C8) The styrene derivative represented by the formula (IV) wherein X' is a group containing an acid halide group and the polyolefin having a terminal functional group represented by the formula (V) wherein Y is an amino group.
(C9) The styrene derivative represented by the formula (IV) wherein X' is a group containing a halogen and the polyolefin having a terminal functional group represented by the formula (V) wherein Y is a hydroxyl group.
(C10) The styrene derivative represented by the formula (IV) wherein X' is a group containing an epoxy group and the polyolefin having a terminal functional group represented by the formula (V) wherein Y is a hydroxyl group.
(C11) The styrene derivative represented by the formula (IV) wherein X' is a group containing an amino group and the polyolefin having a terminal functional group represented by the formula (V) wherein Y is a carboxyl group.
(C12) The styrene derivative represented by the formula (IV) wherein X' is a group containing an amino group and the polyolefin having a terminal functional group represented by the formula (V) wherein Y is an acid halide group.
(C13) The styrene derivative represented by the formula (IV) wherein X' is a group containing an amino group and the polyolefin having a terminal functional group represented by the formula (V) wherein Y is an acid anhydride group.
(C14) The styrene derivative represented by the formula (IV) wherein X' is a group containing an isocyanate group and the polyolefin having a terminal functional group represented by the formula (V) wherein Y is a hydroxyl group.

The molar ratio of the styrene derivative represented by the formula (IV) to the polyolefin having a functional group represented by the formula (V) in production of the polyolefin macromonomer having a styryl group at the terminal thereof in the present invention is usually in the range of 0.01 to 100, more preferably 0.1 to 10.

The reaction solvent includes, for example, aliphatic hydrocarbons such as pentane, hexane, heptane, octane, decane, dodecane and tetradecane, alicyclic hydrocarbons such as cyclopentane, methylcyclopentane, cyclohexane, methylcyclohexane, cyclooctane and cyclohexene, aromatic hydrocarbons such as benzene, toluene and xylene, halogenated hydrocarbons such as dichloromethane, chloroform, dichloroethane, dichloropropane, trichloroethylene, chlorobenzene, dichlorobenzene and 2,4-dichlorotoluene, esters such as methyl acetate, ethyl acetate and butyl acetate, ketones such as acetone and methyl ethyl ketone, and dioxane, tetrahydrofuran, acetonitrile, dimethylformamide and dimethyl sulfoxide. These can be used alone or as a mixture thereof.

For the reaction of the styrene derivative represented by the formula (IV) with the polyolefin having a functional group represented by the formula (V), a condensation accelerator can be added if necessary to allow the reaction to proceed efficiently.

The condensation accelerator includes, for example, inorganic dehydrating condensation agents such as conc. sulfuric acid, diphosphorus pentaoxide and anhydrous zinc chloride, carbodiimides such as dicyclohexyl carbodiimide, diisopropyl carbodiimide and 1-ethyl-3-(3-dimethylamino propyl carbodiimide) hydrochloride, polyphosphoric acid, acetic anhydride, carbonyl diimidazole and p-toluene sulfonyl chloride.

The reaction of the styrene derivative represented by the formula (IV) with the polyolefin having a functional group represented by the formula (V) is carried preferably in the presence of a basic catalyst. Examples of the basic catalyst include organic amines such as triethylamine, diisopropyl ethyl amine, N,N-dimethyl aniline, piperidine, pyridine, 4-dimethylaminopyridine, 1,5-diazabicyclo[4,3,0] non-5-ene, 1,8-diazabicyclo[5,4,0] undec-7-ene, tri-n-butyl amine and N-methylmorpholine, and alkali metal compounds such as sodium hydride, potassium hydride, lithium hydride and n-butyl lithium.

When the styrene derivative represented by the formula (IV) and the polyolefin in having a functional group represented by the formula (V) wherein their functional group is a carboxyl group are used, the polyolefin in macromonomer can be produced by reacting such compounds with e.g. phosphorus pentachloride or thionyl chloride to form their corresponding acid chloride compounds and then reacting the resulting polyolefin having a functional group represented by the formula (V) with the resulting styrene derivative represented by the formula (IV) in a suitable solvent.

Further, when the styrene derivative having a group containing a halogen atom represented by the formula (IV) is used, the polyolefin in macromonomer can be produced by converting the polyolefin having a functional group represented by the formula (II) wherein Y is a hydroxyl group into an alkoxide by a metal alkoxidizing agent and then reacting the alkoxide with the styrene derivative represented by the formula (II) in a suitable solvent. The metal alkoxidizing agent includes, for example, metal sodium, metal potassium, sodium hydride, potassium hydride, and soda amide.

The polyolefin in macromonomer (MM-3) having a styryl group at the terminal of polyolefin chain P represented by the formula (I-c) below is produced in this manner. In the formula (X), W is a heteroatom or a heteroatom-containing group, and P has the same meaning as defined for P in the formula (I).

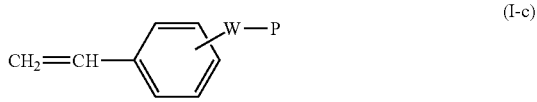

(I-c)

[3] Graft Polymer (GP)

The graft polymer (GP) according to the present invention is a homopolymer of the polyolefin macromonomer (MM) or a copolymer of the polyolefin macromonomer (MM) and at least one monomer (CM) selected from organic compounds each having at least one carbon-carbon unsaturated bond.

The graft monomer (GP) according to the present invention can be obtained through radical polymerization, anion polymerization or coordination polymerization or the like by polymerizing the polyolefin macromonomer (MM) alone or a mixture of the polyolefin macromonomer (MM) and at least one monomer (CM) selected from organic compounds each having at least one carbon-carbon unsaturated bond.

The monomer (CM) is selected from organic compounds each having at least one carbon-carbon unsaturated bond. The carbon-carbon unsaturated bond is a carbon-carbon double bond or a carbon-carbon triple bond. Examples of such organic compounds include (meth) acrylate monomers such as (meth) acrylic acid, methyl (meth)acrylate, ethyl (meth)acrylate, n-propyl (meth)acrylate, isopropyl (meth) acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth) acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxy silane, (meth)acrylic acid/ethylene oxide adducts, trifluoromethylmethyl (meth) acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate and 2-perfluorohexadecylethyl (meth)acrylate, styrene monomers such as styrene, vinyl toluene, α-methyl styrene, chlorostyrene, styrenesulfonic acid and salts thereof, fluorine-containing vinyl monomers such as perfluoroethylene, perfluoropropylene and vinylidene fluoride, silicon-containing vinyl monomers such as vinyl trimethoxy silane and vinyl triethoxy silane, maleimide monomers such as maleic anhydride, maleic acid, monoalkyl and dialkyl maleates, fumaric acid, monoalkyl and dialkyl fumarates, maleimide, methyl maleimide, ethyl maleimide, propyl maleimide, butyl maleimide, hexyl maleimide, octyl maleimide, dodecyl maleimide, stearyl maleimide, phenyl maleimide and cyclohexyl maleimide, nitrile group-containing vinyl monomers such as acrylonitrile and methacrylonitrile, amide group-containing vinyl monomers such as acrylamide and methacrylamide, vinyl ester monomers such as vinyl acetate, vinyl propionate, vinyl pivalate, vinyl benzoate and vinyl cinnamate, olefinic monomers such as ethylene, propylene and butene, diene monomers such as butadiene and isoprene, and vinyl chloride, vinylidene chloride, allyl chloride and allyl alcohol. These organic compounds may be used alone or in combination thereof as the component (CM).

As the initiator used in the radical polymerization, any initiators used in usual radical polymerization can be used, and examples thereof include azo initiators such as azobisisobutyronitrile, azobis-2,4-dimethylvaleronitrile, azobiscyclohexane carbonitrile, azobis-2-amidinopropane hydrochloride, dimethyl azobisisobutyrate, azobisisobutylamidine hydrochloride and 4,4'-azobis-4-cyanovaleric acid, peroxide initiators such as benzoyl peroxide, benzoyl 2,4-dichloroperoxide, di-tert-butyl peroxide, lauroyl peroxide, acetyl peroxide, diisopropyl dicarbonate peroxide, cumene hydroperoxide, tert-butyl hydroperoxide, dicumyl peroxide, p-menthane hydroperoxide, pinane hydroperoxide, methyl ethyl ketone peroxide, cyclohexanone peroxide, diisopropyl peroxy dicarbonate, tert-butyl peroxy laurate, di-tert-butyl peroxy phthalate, dibenzyl oxide and 2,5-dimethylhexane-2,5-dihydroperoxide, and redox initiators such as benzoyl peroxide-N,N-dimethyl aniline and peroxodisulfuric acid-sodium hydrogen sulfite.

The initiator is preferably an azo initiator or a peroxide initiator, more preferably azobisisobutyronitrile, azobis-2,4-dimethylvaleronitrile, azobiscyclohexane carbonitrile, dimethyl azobisisobutyrate, benzoyl peroxide, benzoyl 2,4-dichloroperoxide, di-tert-butyl peroxide, lauroyl peroxide, diisopropyl dicarbonate peroxide, or acetyl peroxide. These radical polymerization initiators can be used alone, or two or more thereof can be used successively.

The usable solvent may be any solvent insofar as the reaction is not inhibited thereby. Examples thereof include aromatic hydrocarbon solvents such as benzene, toluene and xylene, aliphatic hydrocarbon solvents such as pentane, hexane, heptane, octane, nonane and decane, alicyclic hydrocarbon solvents such as cyclohexane, methylcyclohexane and decahydronaphthalene, chlorinated hydrocarbon solvents such as chlorobenzene, dichlorobenzene, trichlorobenzene, methylene chloride, chloroform, carbon tetrachloride and tetrachloroethylene, alcohol solvents such as methanol, ethanol, n-propanol, iso-propanol, n-butanol, sec-butanol and tert-butanol, ketone solvents such as acetone, methyl ethyl ketone and methyl isobutyl ketone, ester solvents such as ethyl acetate and dimethyl phthalate, and ether solvents such as dimethyl ether, diethyl ether, di-n-amyl ether, tetrahydrofuran and dioxy anisole. Suspension polymerization or emulsion polymerization can be carried out using water as the solvent. These solvents may be used alone or as a mixture of two or more thereof. By using these solvents, the reaction solution preferably becomes a uniform phase, but may become a plurality of heterogeneous phases.

The reaction temperature may be any temperature at which the polymerization reaction proceeds, and varied depending on the degree of polymerization of the desired polymer, the type and amount of the radical polymerization initiator and solvent used, but the reaction temperature is usually −100° C. to 250° C., preferably −50° C. to 180° C., still more preferably 0° C. to 160° C. The reaction can be carried out under reduced pressure, at normal pressures or under pressure depending on the case. The polymerization reaction is conducted preferably in an inert gas atmosphere such as nitrogen or argon.

Besides the radical polymerization initiators described above, a living radical polymerization method described below can be used in radical polymerization.

1) Chem. Rev., 101, 2921 (2001)
2) Chem. Rev., 101, 3689 (2001)
3) Chem. Rev., 101, 3661 (2001)

As the anion polymerization initiator in anion polymerization, any initiators used in usual anion polymerization can be used, and use can be made of e.g. organolithium compounds such as butyl lithium, propyl lithium, ethyl lithium and methyl lithium, Grignard reagent etc.

The usable solvent includes, for example, aliphatic hydrocarbons such as hexane and heptane, alicyclic hydrocarbons such as cyclopentane and cyclohexane, aromatic hydrocarbons such as benzene and toluene, and ether solvents such as diethyl ether, dioxane, tetrahydrofuran (THF), monogrime and digrime. These solvents can be used alone or in combination thereof. In particular, aromatic hydrocarbons and ether solvents are preferably used. The polymerization is carried out usually at a temperature of −100° C. to 100° C., preferably −80° C. to 80° C., more preferably −70° C. to 70° C. and for 1 minute to 500 hours, preferably 10 minutes to 300 hours, more preferably 15 minutes to 150 hours.

As the polymerization catalyst in the coordination polymerization, the catalyst used in production of e.g. the above-component (A) can be used. The polymerization catalyst used is preferably a metallocene catalyst or a post-metallocene catalyst. The polymerization conditions can be identical with those in production of the polyolefin chain (P) in the above-mentioned polyolefin in macromonomer (MM). The comonomer used in copolymerization is not particularly limited insofar as it is a monomer selected from one or more monomers (CM) selected from organic compounds each having at least one carbon-carbon unsaturated bond, and among these monomers (CM), olefinic monomers such as ethylene, propylene and butene and diene monomers such as butadiene and isoprene are preferable, and olefinic monomers such as ethylene, propylene and butane are more preferable.

[4] Graft Polymer (GP), a Thermoplastic Resin Composition Containing the same, and uses thereof The graft polymer having a polyolefin backbone according to the present invention can be used in various uses, for example in the following uses.

(1) Film and sheet: A film and sheet comprising the graft polymer having a polyolefin backbone according to the present invention are superior in flexibility, transparency, tackiness, fog resistance, heat resistance and releasability.

(2) A laminate containing at least one layer consisting of the graft polymer having a polyolefin backbone, for example an agricultural film, a wrapping film, a shrinking film, a protecting film, a membrane for separation of blood plasma components, a separation membrane such as a water-selective permeation vaporization membrane, and selective separation membranes such as an ion-exchange membrane, a battery separator and an optical resolution membrane.

(3) Microcapsules, PTP package, chemical pulp, drug delivery system.

(4) The graft polymer used as a modifier for modified resin exert modification effects such as impact resistance, flowability, coating properties, crystallizability, adhesion and transparency.

The graft polymer used as the rubber modifier exhibits modification effects such as weatherability, heat resistance, adhesion and oil resistance. The rubber includes crosslinked rubber such as natural rubber (NR), isoprene rubber (IR), butadiene rubber (BR), styrene-butadiene rubber (SBR), chloroprene rubber (CR), acrylonitrile-butadiene rubber (NBR), butyl rubber (IIR), ethylene-propylene rubber (EPM, EPDM), chlorosulfonated polyethylene (CSM), acryl rubber (ACM, ANM etc.), epichlorohydrin rubber (CO, ECO etc.), silicon rubber (Q), fluoro rubber(FKM etc.) etc.; and thermoplastic rubber such as those based on styrene, olefin, urethane, ester, amide and vinyl chloride.

The graft polymer of the invent ion can be used as a modifier for lubricant oil, for example gasoline engine oil, diesel engine oil, engine oil for ship, gear oil, machine oil, metal processing oil, motor oil, machine oil, spindle oil, and lubricant oil such as insulating oil, or viscosity regulator, and a freezing-point depressant. The graft polymer used as a modifier for wax exhibits modification effects such as adhesion, flowability and strength. The wax includes mineral wax such as montan wax, peat wax, ozokerite/ceresin wax and petroleum wax, synthetic wax such as polyethylene, Fischer-Tropsch wax, chemically modified hydrocarbon wax and substituted amide wax, vegetable wax and animal wax.

The graft polymer used as a cement modifier has modification effects such as moldability and strength. The cement include air-setting cement such as lime, gypsum and magnesia cement, hydraulic cement such as roman cement, natural cement, Portland cement, alumina cement and high sulfate slag cement, and special cement such as acid-resistant cement, refractory cement, water glass cement, and dental cement.

(5) The graft polymer is used as a viscosity regulator, a moldability improver, ink such as a letterpress ink, a lithographic ink, a flexographic ink and a gravure ink, an oil paint, a cellulose derivative paint, a synthetic resin paint, an aqueous baking paint, a powdery aqueous paint, a viscosity regulator for ink/coating such as Japanese lacquer, and a moldability modifier.

(6) Building materials/materials for civil engineering, for example, resin for building materials/civil engineering and molded articles for building materials/civil engineering such as floor materials, floor tiles, floor sheet, sound insulating sheet, thermally insulating panels, insulations, decorative sheet, baseboard, asphalt modifier, gasket/sealing material, roofing sheet, water-stop sheet etc.

(7) Automobile interior and exterior materials and gasoline tank; Automobile interior and exterior materials and gasoline tank comprising the graft polymer having a polyolefin backbone according to the present invention are excellent in rigidity, impact resistance, oil resistance and heat resistance.

(8) Electrically insulating materials for electrical and electronic parts; tools for treatment of electronic parts; electrical and electronic parts such as a magnetic recording medium, a binder in a magnetic recording medium, a sealing material in an electrical circuit, a material for home appliances, an equipment part for a container such as a container for a microwave oven, a film for a microwave oven, a high-molecular electrolyte base material, an electroconductive alloy base material, a connector, a socket, a resistor, a relay case switch coil bobbin, a condenser, a hair clipper case, a light pickup, a light connector, an oscillator, various terminal boards, a transformer, a plug, a print circuit board, a tuner, a speaker, a microphone, a head phone, a small motor, a magnetic head base, a power module, a housing, a semiconductor, LED devices, an FDD carriage, an FDD chassis, HDD parts, a motor brush holder, a parabola antenna, and computer-related parts; home and office electrical product parts, office computer-related parts, telephone-related parts, facsimile-related parts, copying machine-related parts, electromagnetic shielding materials, speaker cone material, vibrating elements for speakers, etc such as VTR parts, TV parts, an iron, a hair dryer, rice cooker parts, microwave oven parts, audio parts, voice instrument parts such as audio/laser disk (registered trademark)/compact disk, lighting parts, refrigerator parts, air-conditioner parts, typewriter parts, word processor parts etc.

(9) An aqueous emulsion: An aqueous emulsion containing the graft polymer having a polyolefin backbone according to the present invention can be used as an adhesive for polyolefin excellent in heat sealing.

(10) A coating base: A solvent dispersion containing the graft polymer having a polyolefin in backbone according to the present invention is excellent in dispersion stability in solvent, and shows good adhesion upon adhesion of metal or polar resin to polyolefin.

(11) Medical and hygienic nonwoven fabrics, a laminate of nonwoven fabrics, electrets, a medical tube, a medical container, a blood transfusion bag, a pre-filled syringe, medical articles such as hypodermic syringe, medical materials, artificial organs, artificial muscles, filtration membrane, food hygiene/health articles; a retort bag, freshness-keeping film etc.

(12) Stationery such as a sundry desk mat, a cutting mat, a ruler, a pen body/grip/cap, grips of scissors and cutter, a magnetic sheet, a pen case, a paper holder, a binder, a label sheet, a tape, a white board; daily sundries such as clothing, a curtain, a bottom sheet, a carpet, an entrance mat, a bath mat, a bucket, a hose, a bag, a planter, a filter in an air conditioner or a ventilation fan, tableware, a tray, a cup, a lunch box, a funnel for coffee siphon, a flame of eyeglasses, a container, a storage case, a hanger, a rope and a washing net; sporting articles such as shoes, goggles, a ski plate, a racket, a ball, a tent, swimming goggles, fins, a fishing rod, a cooler box, a leisure sheet and a sporting net; toys such as block and card; containers such as petroleum can, drum can, and bottles for detergent and shampoo; and displays such as signboard, pylon and plastic chain.

(13) A filler modifier: The graft polymer having a polyolefin backbone according to the present invention can be used preferably as an improver for filler dispersibility and an additive for preparation of fillers with improved dispersibility.

(14) Compatibilizers: The graft polymer having a polyolefin backbone according to the present invention can be used as a compatibilizer. When the graft polymer having a polyolefin backbone according to the present invention is used, polyolefin in and thermoplastic resin having polar groups can be mixed in an arbitrary ratio. The graft polymer having a polyolefin backbone according to the present invention has polyolefin segments and functional segments and can thus make originally non-compatible components compatible with one another and can improve elongation at breakage significantly as compared with the case where the graft polymer having a polyolefin backbone is not used.

As compared with macromonomers obtained in production processes known in the art, the polyolefin macromonomer according to the present invention is advantageous for example in the following respects:

(1) The molecular weight distribution of the macromonomer is broad with a Mw/Mn ratio of 1.5 or more, and thus the molecular weight distribution of the graft polymer produced is relatively broad, thus making the polymer excellent in moldability.

(2) When the graft polymer of the present invention is used in combination with other polyolefin resin, the molecular weight distribution of the macromonomer is near to the molecular weight distribution of the simultaneously used polyolefin resin, thus making the polymer excellent in affinity without deteriorating performance inherent in the polyolefin resin.

(3) A Ziegler catalyst or a metallocene catalyst can be used to produce a polyolefin chain in the macromonomer, and thus the process is very advantageous in respect of productivity.

(4) As compared with the known methods using an alkyl lithium compound or a specific vanadium compound as an olefin polymerization catalyst, various polymerization catalysts can be used, and the usable polymerization temperature is very broad.

(5) The molecular weight and molecular weight distribution can be arbitrarily controlled, and a wide variety of α-olefins can be polymerized in an arbitrary composition.

(6) A high-molecular weight isotactic polypropylene macromonomer can be produced.

EXAMPLE

Hereinafter, the present invention is described in more detail by reference to the Examples, but the present invention is not limited thereto.

Example 1

[Synthesis of an Ethylene-propylene Random Copolymer Modified at the Terminal thereof]

800 ml purified toluene was introduced into a glass autoclave with an internal volume of 1 liter purged sufficiently with nitrogen, and the liquid phase and gaseous phase were saturated by blowing 10 liters/h ethylene and 90 liters/h propylene. Thereafter, MAO in an amount of 10 mmol in terms of Al and 0.01 mmol dicyclopentadienyl zirconium dichloride were added at 50° C. to initiate polymerization. After polymerization at normal pressure at 50° C. for 120 minutes, a small amount of isobutyl alcohol was added to terminate the polymerization. The reaction solution was washed 3 times with 300 ml of 1 N aqueous hydrochloric acid and 2 times with 200 ml water, and the organic layer was dried over anhydrous magnesium sulfate and filtered through a glass filter (G3) to remove the magnesium sulfate. The filtrate was concentrated, and the resulting oily matter was dried under vacuum for 10 hours to give 140.4 g colorless transparent oily ethylene-propylene random copolymer (also referred to hereinafter as "EPR"). When the molecular weight (in terms of EPR) of the polymer was determined by GPC, the Mw was 2170, the Mn was 520, and the Mw/Mn ratio was 4.2. IR analysis indicated that the content of propylene in the polymer was 48 mol %, and 19.6 terminal vinylidene groups were contained per 1000 carbon atoms. 50 g of the resulting EPR containing terminal vinylidene groups were introduced into a 500 ml glass reactor purged sufficiently with nitrogen, and 250 ml toluene and 50 ml diisobutyl aluminum hydride were added thereto, and the mixture was heated at 110° C. for 6 hours under stirring. A toluene solution containing the EPR modified at the terminal thereof was obtained in this manner.

[Synthesis of EPR Containing Terminal Hydroxyl Groups]

While the toluene solution obtained above was kept at 110° C., a nitrogen gas was replaced by dry air, and while this temperature was kept, dry air was supplied thereto at a flow rate of 100 liters/h for 6 hours, and then the solution was transferred to a separatory funnel, washed 3 times with 300 ml of 1 N aqueous hydrochloric acid and then 3 times with 300 ml water. The organic layer was dried with anhydrous magnesium sulfate and filtered through a glass filter (G3), then the filtrate was concentrated, and the resulting yellow oily matter was dried for 10 hours under vacuum, to give 47.0 g oily polymer. When the molecular weight (in terms of EPR) of the polymer was determined by GPC, the Mw was 2200, the Mn was 520, and the Mw/Mn ratio was 4.3. A sample obtained by dissolving 100 mg polymer in 0.6 ml chloroform-d at 25° C. was analyzed with $^1$H-NMR (JEOL GSX-270 manufactured by JEOL. Ltd.), indicating a signal at 3.5 ppm attributable to a methylene group adjacent to a hydroxyl group. That is, the presence of EPR having a terminal structure represented by formula (XI) below was confirmed. From the integrated value, the content of hydroxyl groups was calculated to be 2.4 mol %.

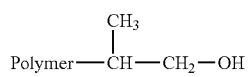

(XI)

[Synthesis of EPR Macromonomer]

20 g of the ERP having terminal hydroxyl groups obtained above was introduced into a 100 ml Schlenk tube purged sufficiently with nitrogen, and 20 ml toluene, 2.7 ml triethylamine and 2.5 ml methacroloyl chloride were added thereto, and the mixture was stirred at room temperature for 3.5 hours. The resulting reaction solution was transferred to a separatory funnel, washed 3 times with 100 ml of 1 N aqueous hydrochloric acid and then 3 times with 100 ml water. The organic layer was dried with anhydrous magnesium sulfate and filtered through a glass filter (G3), then the filtrate was concentrated, and the resulting yellow oily matter was dried for 10 hours under vacuum to give 21.1 g oily polymer. When the molecular weight (in terms of EPR) of the polymer was determined by GPC, the Mw was 2240, the Mn was 690, and the Mw/Mn ratio was 3.3. A sample obtained by dissolving 100 mg polymer in 0.6 ml chloroform-d at 25° C. was analyzed with $^1$H-NMR (JEOL GSX-270 manufactured by JEOL. Ltd.), indicating signals at 1.95 ppm attributable to a methyl group in a methacryloyl group, at 3.8 to 4.2 ppm attributable to a methylene group adjacent to an ester group, and at 5.5 and 6.1 ppm attributable to a vinyl group in a methacryloyl group. That is, the presence of EPR macromonomer having a terminal structure represented by formula (XII) below was confirmed. From the integrated value, the content of methacryloyl groups was calculated to be 2.6 mol %, thus revealing almost quantitative conversion of hydroxyl groups in the starting material.

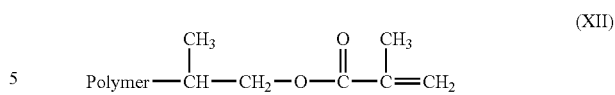

(XII)

Example 2

[Synthesis of a Graft Polymer]

3.0 g of the EPR macromonomer obtained in Example 1 was introduced into a 100 ml Schlenk tube purged sufficiently with nitrogen, then 20 ml chlorobenzene and 90 mg azobisisobutyronitrile (AIBN) were added thereto, and the mixture was heated at 70° C. for 30 hours under stirring. The resulting reaction solution was transferred to a separatory funnel, washed 3 times with 100 ml of 1 N aqueous hydrochloric acid and then 3 times with 100 ml water. The organic layer was dried with magnesium sulfate anhydride and filtered through a glass filter (G3), then the filtrate was concentrated, and the resulting oily matter was dried for 10 hours under vacuum to give 2.3 g oily polymer. When the molecular weight (in terms of EPR) of the polymer was determined by GPC, peaks were detected at a Mw of 46900 and a Mn of 18800. That is, the ERP macromonomer was polymerized to form a graft polymer having EPR as a side chain.

Example 3

[Synthesis of Polyethylene Modified at the Terminal thereof]

800 ml purified decane was introduced into a glass autoclave having an internal volume of 1 L purged sufficiently with nitrogen, and the liquid phase and gaseous phase were saturated by blowing 100 liters/h ethylene. Thereafter, MAO in an amount of 20 mmol in terms of Al and 0.02 mmol dicyclopentadienyl zirconium dichloride were added at 100° C. to initiate polymerization. After polymerization at normal pressure at 100° C. for 120 minutes, a small amount of isobutyl alcohol was added to terminate the polymerization. The reaction solution was introduced into a mixed solution of 1.5 L methanol and 1.5 L acetone, and a small amount of 1 N aqueous hydrochloric acid was added thereto, and the mixture was stirred. The precipitated polymer was separated by filtration with a glass filter from the aqueous phase and dried at 80° C. for 10 hours under reduced pressure. By the procedure described above, 24.6 g white polymer was obtained. When the molecular weight (in terms of PE) of the polymer was determined by GPC, the Mw was 15,200, the Mn was 5,300, and the Mw/Mn ratio was 2.9. IR analysis indicated that 1.1 terminal vinyl groups were contained per 1000 carbon atoms. 14.3 g of the resulting terminal vinyl group-containing polyethylene was introduced into a 1 L glass reactor purged sufficiently with nitrogen, and 750 ml decane and diisobutyl aluminum hydride in an amount of 6.25 mmol in terms of Al were added thereto, and the mixture was heated at 110° C. for 6 hours under stirring. A decane solution containing polyethylene modified at the terminal thereof was obtained in this manner.

[Synthesis of Polyethylene Containing Terminal Hydroxyl Groups]

While the decane solution obtained above was kept at 110° C., a nitrogen gas was replaced by dry air, and while this temperature was kept, dry air was supplied thereto at a flow rate of 100 liters/h for 6 hours, and the reaction slurry was introduced into a mixed solution of 1.5 L methanol and 1.5 L acetone, and a small amount of 1 N aqueous hydrochloric acid was added thereto and stirred. The precipitated polymer was separated by filtration with a glass filter from the liquid phase and dried at 80° C. for 10 hours under reduced pressure. By the above procedure, 13.3 g white polymer was obtained. When the molecular weight (in terms of PE) of the polymer was determined by GPC, the Mw was 15,200, the Mn was 5,300, and the Mw/Mn ratio was 2.9. A sample obtained by dissolving 100 mg polymer in 0.6 ml o-dichlorobenzene-d4 at 120° C. was analyzed with $^1$H-NMR (JEOL GSX-400 manufactured by JEOL. Ltd.), indicating a signal at 3.5 ppm attributable to a methylene group adjacent to a hydroxyl group. That is, the presence of polyethylene having a terminal structure represented by formula (XIII) below was confirmed. From the integrated value, the content of OH groups was calculated to be 0.17 mol %.

(XIII)

[Synthesis of Polyethylene Macromonomer]

5.0 g of the thus obtained polyethylene containing terminal hydroxyl groups was introduced into a 100 ml Schlenk tube purged sufficiently with nitrogen, then 20 ml toluene, 0.7 ml triethylamine and 1.0 ml methacryloyl chloride were added thereto, and the mixture was heated at 80° C. for 3 hours under stirring. The resulting reaction solution was poured into 300 ml methanol, and a small amount of 1 N aqueous hydrochloric acid was added thereto and stirred. The precipitated polymer was separated by filtration with a glass filter from the liquid phase and dried at 80° C. for 10 hours under reduced pressure. By the above procedure, 4.9 g white polymer was obtained. A sample obtained by dissolving 50 mg polymer in 0.6 ml o-chlorobenzene-d4 at 120° C. was analyzed with $^1$H-NMR (JEOL GSX-270 manufactured by JEOL. Ltd.), indicating signals at 4.3 ppm attributable to a methylene group adjacent to an ester group and at 5.6 and 6.2 ppm attributable to a vinyl group in a methacryloyl group. That is, the presence of a polyethylene macromonomer having a terminal structure represented by formula (XIV) below was confirmed.

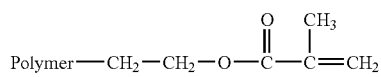

(XIV)

Example 4

[Preparation of the Solid Titanium Catalyst Component (a)]

95.2 g anhydrous magnesium chloride, 485 ml decane and 390.4 g 2-ethylhexyl alcohol were heated at 140° C. for 4 hours to form a uniform solution, and 22.2 g phthalic anhydride was added to this solution, and the mixture was mixed at 130° C. for 1 hour under stirring, whereby the phthalic anhydride was dissolved. The uniform solution thus obtained was cooled to room temperature, and 30 ml of the uniform solution was added dropwise over 45 minutes to 80 ml titanium tetrachloride kept at −20° C. The temperature of the solution was increased to 110° C. over 4 hours, and when the temperature reached 110° C., 2.0 ml diisobutyl phthalate was added thereto, and the mixture was heated at 110° C. for 2 hours. Then, solids were collected by hot filtration, and the solids were suspended again in 110 ml titanium tetrachloride, and then reacted under heating at 110° C. for 2 hours. After the reaction was finished, the solids were collected again by hot filtration and washed sufficiently with decane at 110° C. and hexane at room temperature until a free titanium compound was not detected in the solution. The catalyst component (a) prepared by the above procedure was stored as hexane slurry, a part of which was dried and examined for composition, indicating 2.3 wt % titanium, 19.0 wt % magnesium and 11.8 wt % diisobutyl phthalate.

[Synthesis of Isotactic Polypropylene Modified at the Terminal]thereof 400 ml purified decane was introduced into a glass autoclave with an internal volume of 500 ml purged sufficiently with nitrogen, and the liquid phase and gaseous phase were saturated by blowing 100 liters/h propylene. Thereafter, 10 mmol triethyl aluminum, 1.0 mmol cyclohexyl methyl dimethoxy silane, and the solid titanium component (a) in an amount of 0.2 mmol in terms of titanium atom were added in this order. The mixture was polymerized at 100° C. for 2 hours while the flow rate of propylene was regulated such that the unreacted gas was not leaked out through a bubbler tube connected a purge line and the inside of the reactor was not under reduced pressure. Then, the propylene gas was replaced by a nitrogen gas with which the unreacted propylene gas was purged to terminate the reaction, to give decane slurry containing polypropylene modified at the terminal thereof.

[Synthesis of Isotactic Polypropylene Containing Terminal Hydroxyl Groups]

The decane slurry obtained above was maintained at 100° C. and reacted for 7 hours while dry air was allowed to pass therethrough at a flow rate of 200 liters/h. After the reaction was finished, the reaction slurry was introduced into a mixture of 2 L methanol and 2 L acetone, and a small amount of 1 N aqueous hydrochloric acid was added thereto and stirred. The precipitated polymer was separated by filtration with a glass filter from the liquid phase and dried at 80° C. for 10 hours under reduced pressure. By the above procedure, 4.2 g white polymer was obtained. When the molecular weight (in terms of PP) of the polymer was measured by GPC, the Mw was 140,000, the Mn was 11,100, and the Mw/Mn ratio was 12.6. By IR analysis, an absorption based on shrinkage vibration of hydroxyl groups was recognized at 3640 cm$^{-1}$ was confirmed, and it was confirmed that hydroxyl groups were certainly contained in the polymer. That is, the presence of polypropylene having a structure represented by the formula (XI) was confirmed. Further, the amount of decane-soluble components of the resulting PP was 3.0 wt %, and the melting point (Tm) determined by DSC was 163° C.

[Synthesis of Isotactic Polypropylene Macromonomer]

1.0 g of the thus obtained isotactic polypropylene containing terminal hydroxyl groups was introduced into a 100 ml Schlenk tube purged sufficiently with nitrogen, then 20 ml toluene, 0.7 ml triethylamine and 1.0 ml methacryloyl chloride were added thereto, and the mixture was stirred at 80° C. for 3 hours. The resulting reaction solution was poured into 300 ml methanol, and a small amount of 1 N aqueous hydrochloric acid was added thereto and stirred. The precipitated polymer was separated by filtration with a glass filter from the liquid phase and dried at 80° C. for 10 hours under reduced pressure. By the above procedure, 0.9 g white polymer was obtained. A sample obtained by dissolving 50 mg polymer in 0.6 ml o-chlorobenzene-d4 at 120° C. was analyzed with $^1$H-NMR (JEOL GSX-270 manufactured by JEOL. Ltd.), indicating signals at 4.1 to 4.2 ppm attributable to a methylene group adjacent to an ester group and at 5.6 and 6.2 ppm attributable to a vinyl group in a methacryloyl group. That is, the presence of the isotactic polypropylene macromonomer having a terminal structure represented by the formula (XII) was confirmed.

Example 5

[Synthesis of an Ethylene Polymer Containing a Terminal] Unsaturated Group

A stainless steel autoclave with an internal volume of 2000 ml purged sufficiently with nitrogen was charged with 1000 ml heptane at room temperature and then heated to 150° C. Then, the autoclave was pressurized with 30 kg/cm$^2$ ethylene and kept at the temperature. 0.5 ml (0.5 mmol) hexane solution (1.00 mmol/ml in terms of aluminum atom) of MMAO (Tosoh Finechem Corporation) was injected into the autoclave, and 0.5 ml (0.0001 mmol) toluene solution (0.0002 mmol/ml) of the compound represented by formula (XV) below was injected into it to initiate polymerization. The polymerization was conducted at 150° C. for 30 minutes in an ethylene gas atmosphere, and a small amount of ethanol was injected to terminate the polymerization. The resulting polymer solution was added to 3 L methanol containing a small amount of hydrochloric acid to precipitate the polymer. After washing with methanol, the polymer was dried at 130° C. for 10hours under reduced pressure. The resulting ethylene polymer was 18.8 g, and the polymerization activity was 376 kg/mmol-Zr·hr, the Mw was 2230, the Mw/Mn ratio was 1.52, [η] was 0.12 dl/g, and the degree of vinylation at one terminal was 94.2 mol %.

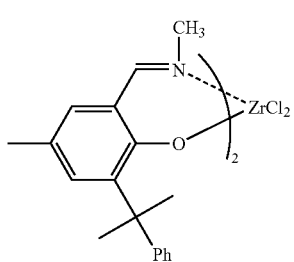

(XV)

[Synthesis of a Polyethylene Macromonomer]

A 500 ml three-necked flask equipped with a Dimroth condenser was charged with the ethylene polymer containing a terminal unsaturated bonding group (10 g), methacrylic acid (50 g, 0.56 mol) and 100 ml toluene, and the mixture was stirred under heating at 100° C. for 30 minutes, to form a solution. 0.1 ml trifluoromethanesulfonic acid was added to the reaction solution, and the mixture was reacted at 100° C. for 24 hours. The reaction solution was cooled to room temperature and introduced into 100 ml methanol, to precipitate solids. The precipitated solids were separated by filtration and washed with water and methanol to give 9.7 g white polymer. A sample obtained by dissolving 10 mg polymer in 0.6 ml tetrachloethane-d2 at 120° C. was analyzed with $^1$H-NMR (JEOL GSX-270 manufactured by JEOL. Ltd.), indicating signals at 1.88 ppm attributable to a methyl group in a methacryloyl group, at 4.83 to 4.86 ppm attributable to a methine group adjacent to an ester group and at 5.4 and 5.9 ppm attributable to a vinyl group in a methacryloyl group. That is, the presence of a polyethylene macromonomer having a terminal structure represented by the following formula (XVI).

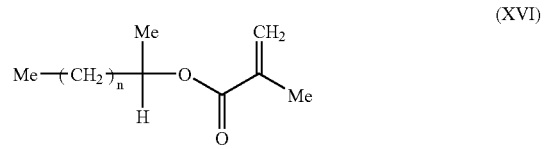

(XVI)

Example 6

[Synthesis of an Ethylene-propylene Copolymer (EPR) Containing]Al at the Terminal thereof 400 ml purified toluene was introduced into a glass autoclave with an internal volume of 500 ml purged sufficiently with nitrogen, and the liquid phase and gaseous phase were saturated by blowing 20 liters/h ethylene and 80 liters/h propylene. Thereafter, MAO in an amount of 10 mmol in terms of Al and 0.01 mmol bis(n-butylcyclopentadienyl) zirconium dichloride were added at 50° C. to initiate polymerization. After polymerization at normal pressure at 50° C. for 120 minutes, 50 ml isobutyl aluminum hydride was added thereto and stirred under heating at 100° C. for 4.5 hours. A toluene solution containing ERP containing Al at the terminal thereof was obtained in this manner.

[Synthesis of EPR Containing Terminal Hydroxyl Groups]

While the toluene solution obtained above was kept at 100° C., a nitrogen gas was replaced by dry air, and while this temperature was kept, dry air was supplied thereto at a flow rate of 100 liters/h for 14 hours, and 200 ml methanol was added to terminate the reaction. The precipitated yellow solids were filtered through a glass filter (G3) and then washed 3 times with 500 ml hexane to extract EPR. The resulting hexane solution was concentrated and dried under vacuum for 10 hours, to give 53.1 g pale yellow oily polymer. When the molecular weight (in terms of EPR) of the polymer was determined by GPC, the Mw was 3700, the Mn was 1100, and the Mw/Mn ratio was 3.4. A sample obtained by dissolving 100 mg polymer in 0.6 ml chloroform-d at 25° C. was analyzed with $^1$H-NMR (JEOL GSX-270 manufactured by JEOL. Ltd. ), indicating signals at 3.3 to 3.6 ppm attributable to a methylene group adjacent to a hydroxyl group. That is, the presence of EPR having a terminal structure represented by the formula (XI) was confirmed. From the integrated value, the content of OH groups was calculated to be 1.3 mol %.

[Synthesis of a Macromonomer]

10 g of the resulting EPR containing terminal hydroxyl groups was introduced into a 100 ml Schlenk tube purged sufficiently with nitrogen, and then 40 ml dry THF and 0.62 g sodium hydride (previously washed 5 times with 5 ml dry hexane to remove mineral oil) were added thereto, and the mixture was stirred at room temperature for 2 hours. The resulting reaction solution was cooled to 0° C. on ice bath, and 3.37 mg p-vinyl benzyl chloride was added thereto. The ice bath was removed, and the mixture was stirred at room temperature for 24 hours, and the reaction solution was poured into a mixed solvent of 400 ml acetone and 400 ml hexane, and the precipitated white precipitates were filtered off with a glass filter (G3). The resulting yellow filtrate was concentrated and dried under vacuum for 10 hours to give 10.4 g yellow oil polymer. This polymer was dissolved in hexane and purified by column chromatography to give 1.1 g slightly yellow oily polymer. When the molecular weight (in terms of EPR) of the polymer was determined by GPC, the Mw was 4800, the Mn was 3000, and the Mw/Mn ratio was 1.6. When a sample obtained by dissolving 100 mg polymer in 0.6 ml chloroform-d at 25° C. was analyzed with $^1$H-NMR (JEOL GSX-270 manufactured by JEOL. Ltd.), the following signals were detected in addition to signals attributable to EPR: $\delta$3.2–3.4 ppm (m, 2H; —O—C$\underline{H}_2$-EPR), $\delta$4.5 ppm (s, 2H; —C$_6$H$_4$—C$\underline{H}_2$—O—), $\delta$5.2 ppm (d, 1H; C$\underline{H}_2$=), $\delta$5.7 ppm (d, 1H; C$\underline{H}_2$=), $\delta$6.7 ppm (d×d, 1H; CH$_2$=C$\underline{H}$—), $\delta$7.2–7.4 ppm (m, 4H; —C$_6$$\underline{H}_4$—). That is, the presence of the EPR macromonomer having a terminal structure represented by formula (XVII) below was confirmed. From the integrated value, the content of styryl groups was calculated to be 0.11 mol %.

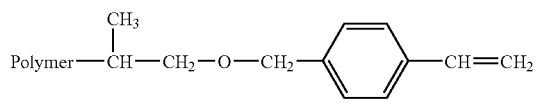

(XVII)

Example 7

[Synthesis of a Graft Polymer]

89 mg of the EPR macromonomer obtained in Example 6 was introduced into a 30 ml Schlenk tube purged sufficiently with nitrogen, and 0.86 ml MMA, 0.14 ml solution of 2.9 mg copper bromide and 0.02 mmol N,N,N',N',N"-pentamethyl diethylene triamine in o-xylene, and 0.04 ml solution of 0.002 mmol ethyl 2-bromoisobutyrate in o-xylene were added thereto and heated at 90° C. for 6 hours under stirring. 10 ml methanol was added to the resulting reaction solution to precipitate a polymer. The resulting polymer was collected by filtration through a glass filter (G3), and the polymer on the filter was washed 3 times with 10 ml hexane and 3 times with 10 ml methanol and dried for 10 hours under vacuum to give 61 mg solid polymer. The content of each unit in the formed polymer analyzed by NMR was 63 weight % MMA and 37 weight % EPR. That is, a graft polymer having EPR as a side chain was formed by copolymerizing the EPR macromonomer with MMA.

Example 8

[Synthesis of an Ethylene-propylene Copolymer (EPR) Modified at the Terminal thereof]

800 ml purified toluene was introduced into a glass autoclave with an internal volume of 1 L purged sufficiently with nitrogen, and the liquid phase and gaseous phase were saturated by blowing 20 liters/h ethylene and 80 liters/h propylene. Thereafter, MAO in an amount of 20 mmol in terms of Al and 0.02 mmol dicyclopentadienyl zirconium dichloride were added at 50° C. to initiate polymerization. After polymerization at normal pressure at 50° C. for 120 minutes, 50 ml diisobutyl ammonium hydride was added thereto and the mixture was heated at 110° C. for 5.5 hours under stirring. A toluene solution containing the ethylene-propylene copolymer modified at the terminal thereof, that is, EPR containing Al at the terminal, was obtained in this manner.

[Synthesis of EPR Containing Terminal Hydroxyl Groups]

While the toluene solution obtained above was kept at 100° C., a nitrogen gas was replaced by dry air, and while this temperature was kept, dry air was supplied thereto at a flow rate of 100 liters/h for 6 hours, and the reaction solution was poured into 1 L methanol to terminate the reaction. The precipitated solids were collected by a glass filter, and the resulting solids were placed in 1 L hexane and stirred well. The insolubles were filtered off with a glass filter, and the filtrate was concentrated and dried under vacuum for 10 hours to give 125.4 g yellow oily polymer. A sample obtained by dissolving 100 mg polymer in 0.6 ml chloroform-d at 250° C. was analyzed with $^1$H-NMR (JEOL GSX-270 manufactured by JEOL. Ltd.), indicating signals at 3.3 to 3.6 ppm attributable to a methylene group adjacent to a hydroxyl group. That is, the presence of EPR having a terminal structure represented by the formula (XI) was confirmed. From the integrated value, the content of OH groups was calculated to be 2.9 mol %.

[Synthesis of a Macromonomer]

120 g of the resulting EPR containing terminal hydroxyl groups and 250 ml dry toluene were introduced into a 500 ml reactor purged sufficiently with nitrogen, and then stirred at room temperature for 2 hours. This solution was cooled on an ice bath at 0° C., and 13.4 ml triethylamine and 18.8 ml methacryloyl chloride were added thereto. Thereafter, the ice bath was removed, and the mixture was stirred at room temperature for 6 hours, and the precipitated white precipitates were filtered off, and the filtrate was concentrated and dried under vacuum for 10 hours to give 130.2 g yellow oily polymer. This polymer was dissolved in hexane and purified by column chromatography to give 50.6 g pale yellow oily polymer. When the molecular weight of the polymer was determined by GPC, the Mw was 2,900, the Mn was 1,500, and the Mw/Mn ratio was 1.9. A sample obtained by dissolving 100 mg polymer in 0.6 ml chloroform-d at 25° C. was analyzed with $^1$H-NMR (JEOL GSX-270 manufactured by JEOL. Ltd.), indicating signals at 1.95 ppm attributable to a methyl group in a methacryloyl group, at 3.8 to 4.2 ppm attributable to a methylene group adjacent to an ester group, and at 5.5 and 6.1 ppm attributable to a vinyl group in a methacryloyl group. That is, the presence of the EPR macromonomer having a terminal structure represented by the formula (XII) was confirmed. From the integrated value, the content of methacryloyl groups was calculated to be 3.1 mol %.

Example 9

[Synthesis of a Graft Polymer]

1.0 g of the EPR macromonomer obtained in Example 8 was introduced into a 30 ml Schlenk tube purged sufficiently with nitrogen, and 10 ml toluene and 0. 016 mmol AIBN were added thereto and the mixture was stirred at 60° C. for 3 hours. The resulting reaction solution was poured into methanol, the supernatant was removed, and the remaining oily material was dried for 10 hours under vacuum to give 0.35 g oily polymer. When the molecular weight of the polymer was determined by GPC, peaks were detected at a Mw of 885,000 and at a Mn of 215,000. That is, the EPR macromonomer was polymerized to form a graft polymer having EPR as a side chain.

Example 10

[Synthesis of a Graft Polymer]

0.98 g of the EPR macromonomer obtained in Example 8 was introduced into a 30 ml Schlenk tube purged sufficiently with nitrogen, and 10 ml toluene, 2.1 ml MMA and 0.1 mmol AIBN were added thereto and the mixture was stirred under heating at 60° C. for 4 hours. The resulting reaction solution was poured into 2 L methanol, and the precipitated white solids were filtered with a glass filter and stirred in 200 ml hexane. The insolubles were collected again by filtration, and the solids on the filter was washed with hexane and dried for 10 hours under reduced pressure to give 0.74 g white solids. When the molecular weight of the polymer was determined by GPC, the Mw was 114,000, the Mn was 60,000, and the Mw/Mn was 1.9. The content of each unit in the formed polymer analyzed by NMR was 83 weight % MMA and 17 weight % EPR. That is, a graft polymer having EPR as a side chain was formed by copolymerizing the EPR macromonomer with MMA.

Example 11

[Synthesis of a Graft Polymer]

4.9 g of the EPR macromonomer obtained in Example 8 was introduced into a 30 ml Schlenk tube purged sufficiently with nitrogen, and 14.1 ml o-xylene, 4.3 ml MMA, 1.2 ml solution of 0.2 mmol copper bromide and 0.4 mmol N,N,N',N', N"-pentamethyl diethylene triamine in o-xylene, and 0.5 ml solution of 0.2 mmol (1-bromoethyl)benzene in o-xylene were added thereto and heated at 90° C. for 6 hours under stirring. The resulting reaction solution was poured into 2 L methanol to precipitate a polymer. The resulting polymer was collected by filtration through a glass filter (G3), and the polymer on the filter was washed with hexane and then dried for 10 hours under vacuum to give 2.8 g white solids. When the molecular weight of the polymer was determined by GPC, the Mw was 39,000, the Mn was 28,000, and the Mw/Mn ratio was 1.4. The content of each unit analyzed by NMR was 60 weight % MMA and 40 weight % EPR. That is, a graft polymer having EPR as a side chain was formed by copolymerizing the EPR macromonomer with MMA. When this graft polymer was observed under a transmission electron microscope (TEM), it was found that the EPR segment and PMMA segment are finely dispersed in the order of several nm. (FIG. 1)

Example 12

[Evaluation of a Compatibilizer]

0.45 g EPR (Mn=41,000), 0.45 g PMMA (Mn=28,000) and 0.10 g PMMA-g-EPR obtained in Example 11 were introduced into a 100 mg Schlenk tube, and 20 ml o-xylene was added thereto, and the mixture was stirred at 130° C. for 1 hour. The reaction solution was poured into 1 L methanol, and the precipitated polymer was filtered and dried for 10 hours under vacuum to give white solids. The resulting solids were observed under TEM (FIG. 3).

Reference Example 1

[Evaluation of a Compatibilizer]

White solids were obtained in the same manner as in Example 12 except that PMMA-g-EPR was not added. When the resulting white solids were observed under TEM, PMMA domain was present in the form of a mass in the EPR matrix (large triangular white region observed in the lower right in FIG. 2 indicates PMMA). On the other hand, the system to which the polymer (PMMA-g-EPR) obtained in Example 12 was added indicated that the PMMA segment and EPR segment were finely dispersed (see FIG. 3), thus revealing that PMMA-g-EPR has excellent performance as a compatibilizer.

Example 13

[Synthesis of an Ethylene-propylene Copolymer (EPR) Modified at the Terminal thereof]

800 ml purified toluene was introduced into a glass autoclave with an internal volume of 1 L purged sufficiently with nitrogen, and the liquid phase and gaseous phase were saturated by blowing 40 liters/h ethylene and 60 liters/h propylene. Thereafter, MAO in an amount of 20 mmol in terms of Al and 0.02 mmol bis(1,3-dimethylcyclopentadienyl) zirconium dichloride were added at 60° C. to initiate polymerization. After polymerization at normal pressure at 60° C. for 120 minutes, 44 ml diisobutyl aluminum hydride was added thereto and stirred under heating at 100° C. for 4 hours. A toluene solution containing an ethylene-propylene copolymer modified at the terminal thereof, that is, EPR containing Al at the terminal thereof was obtained in this manner.

[Synthesis of EPR Containing Terminal Hydroxyl Groups]

While the toluene solution obtained above was kept at 100° C., a nitrogen gas was replaced by dry air, and while this temperature was kept, dry air was supplied thereto at a flow rate of 100 liters/h for 7 hours, and 200 ml methanol was added to terminate the reaction. The precipitated solids were collected by a glass filter, and the resulting solids were extracted 5 times with 200 ml hexane. The extract was concentrated and dried under vacuum for 10 hours to give 90.5 g colorless transparent oily polymer. A sample obtained by dissolving 100 mg polymer in 0.6 ml chloroform-d at 25° C. was analyzed with $^1$H-NMR (JEOL GSX-270 manufactured by JEOL. Ltd.), indicating signals at 3.3 to 3.6 ppm attributable to a methylene group adjacent to a hydroxyl group. That is, the presence of EPR having a terminal structure represented by the formula (XI) was confirmed. From the integrated value, the content of OH groups was calculated to be 0.94 mol %.

[Synthesis of a Macromonomer]

50 g of the resulting EPR containing terminal hydroxyl groups and 50 ml dry toluene were introduced into a 200 ml two-necked flask purged sufficiently with nitrogen, and then stirred at room temperature for 2 hours. This solution was cooled on an ice bath, and 9.3 ml triethylamine and 13.0 ml methacryloyl chloride were added thereto. Thereafter, the ice bath was removed, and the mixture was stirred at room temperature for 21 hours, and the reaction solution was transferred to a separatory funnel. The reaction solution was washed 5 times with 200 ml 1 N aqueous hydrochloric acid and 3 times with 200 ml water, and the organic layer was dried with $MgSO_4$. The $MgSO_4$ was filtered off, and the filtrate was concentrated and dried under vacuum for 10 hours to give 61.2 g pale yellow oily polymer. This polymer was dissolved in hexane and purified by column chromatography to give 11.7 g pale yellow oily polymer. When the molecular weight of the polymer was determined by GPC, the Mw was 8,500, the Mn was 5,400, and the Mw/Mn ratio was 1.6. A sample obtained by dissolving 100 mg polymer in 0.6 ml chloroform-d at 25° C. was analyzed with ¹H-NMR (JEOL GSX-270 manufactured by JEOL. Ltd.), indicating signals at 1.95 ppm attributable to a methyl group in a methacryloyl group, at 3.8 to 4.2 ppm attributable to a methylene group adjacent to an ester group, and at 5.5 and 6.1 ppm attributable to a vinyl group in a methacryloyl group. That is, the presence of the EPR macromonomer having a terminal structure represented by the formula (XII) was confirmed. From the integrated value, the content of methacryloyl groups was calculated to be 0.97 mol %.

Example 14

[Synthesis of a Graft Polymer]

1.5 g of the EPR macromonomer obtained in Example 13 was introduced into a 30 ml Schlenk tube purged sufficiently with nitrogen, and 6.4 ml o-xylene, 2.1 ml MMA, 1.2 ml solution of 0.1 mmol copper bromide and 0.2 mmol N,N,N',N',N"-pentamethyl diethylene triamine in o-xylene, and 0.2 ml solution of 0.1 mmol (1-bromoethyl)benzene in o-xylene were added thereto and heated at 90° C. for 6 hours under stirring. The resulting reaction solution was poured into 400 ml methanol to precipitate a polymer. The resulting polymer was collected by filtration through a glass filter (G3), and the polymer on the filter was washed with hexane and then dried for 10 hours under vacuum to give 1.5 g white solids. When the molecular weight of the polymer was determined by GPC, the Mw was 41,000, the Mn was 28,000, and the Mw/Mn ratio was 1.5. The content of each unit analyzed by NMR was 70 weight % MMA and 30 weight % EPR. That is, a graft polymer having EPR as a side chain was formed by copolymerizing the EPR macromonomer with MMA.

What is claimed is:

1. A polyolefin macromonomer comprising a polyolefin chain (P), a vinyl group (X) which may be substituted at the a-position thereof, and a linking group (Z) for connecting both, represented by the following general formula (I):

P-Z-X (I)

wherein P is a polymer chain having a molecular weight distribution (Mw/Mn) equal to or more than 1.5, obtained by homopolymerizing or copolymerizing olefins in the presence of a coordination polymerization catalyst containing a transition metal compound, said olefins being represented by $CH_2=CHR^1$ wherein $R^1$ is a hydrocarbon group having 1 to 20 carbon atoms, a hydrogen atom or a halogen atom, provided that Mn is equal to or more than 1000 when P is a homopolymer residue of polypropylene, X is a vinyl group which may be substituted at the a-position thereof, represented by $-C(R^2)=CH_2$ whereupon $R^2$ represents a hydrogen atom or a methyl group, and Z is an ester group (B1) represented by formula (VIII') or a phenylene group (B2) represented by formula (VIII) wherein W includes ether linkage-containing group having a group containing a group selected from a carboxylate group, an amide group, an ether group and a carbamate group, and an ether oxygen atom in (B1) is covalently bound to the polyolefin (P):

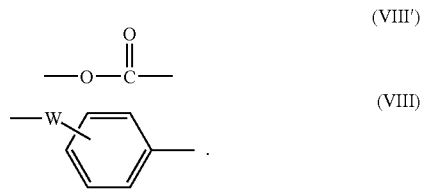

2. The polyolefin macromonomer according to claim 1, which is obtained by successively conducting the following steps (A) and (B):

Step (A): a step of producing polyolefin having a hydroxyl group at the terminal of a polyolefin chain (P), represented by the following general formula (II):

P—OH (II)

wherein P has the same meaning as defined for P in the formula (I);

Step (B): a step of converting a terminal hydroxyl group in the polyolefin chain (P) obtained in the step (A) into an acryloyl group or a methacryloyl group.

3. The polyolefin macromonomer according to claim 1, obtained by successively conducting the following steps (A') and (B'):

Step (A'): a step of producing polyolefin having an unsaturated bond at the terminal of a low molecular weight polymer P', represented by the following general formula (III):

P'—U (III)

wherein P' is a polymer having 10 to 2000 carbon atoms and consisted of constitutional units derived from ethylene only or ethylene and an x-olefin having 3 to 10 carbon atoms, wherein the constitutional unit derived from ethylene is 20 to 100 mol %, and the constitutional unit derived from α-olefin is 0 to 80 mol %, and U represents a vinyl group or a vinylidene group;

Step (B'): a step of converting the terminal vinyl or vinylidene group in the low molecular weight polymer P' obtained in the step (A') into an acryloyl group or a methacryloyl group.

4. A graft polymer having a polyolefin backbone obtained by polymerizing a polyolefin macromonomer comprising a polyolefin chain (P), a vinyl group (X) which may be substituted at the a-position thereof, and a linking group (Z) for connecting both, represented by the following general formula (I):

P-Z-X (I)

wherein P is a polymer chain having a molecular weight distribution (Mw/Mn) equal to or more than 1.5, obtained by homopolymerizing or copolymerizing olefins in the presence of a coordination polymerization catalyst containing a transition metal compound, said olefins being represented by $CH_2=CHR^1$ wherein $R^1$ is a hydrocarbon group having 1 to 20 carbon atoms, a hydrogen atom or a halogen atom, provided that Mn is equal to or more than 1000 when P is a homopolymer residue of polypropylene, X is a vinyl group which may be substituted at the a-position thereof, represented by —C(R²)=CH₂ whereupon R² represents a hydrogen atom or a methyl group, and Z is an ester group (B1) represented by formula (VIII') or a phenylene group (B2) represented by formula (VIII) wherein W includes ether linkage-containing group having a group containing a group selected from a carboxylate group, an amide group, an ether group and a carbamate group, and an ether oxygen atom in (B1) is covalently bound to the polyolefin (P):

$$-O-\underset{\underset{O}{\|}}{C}-\qquad(\text{VIII}')$$

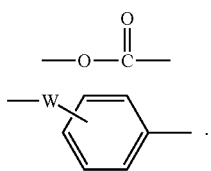
(VIII)

5. The graft polymer having a polyolefin backbone according to claim 4 obtained by copolymerizing the polyolefin macromonomer represented by the above general formula (I) and at least one monomer selected from organic compounds having at least one carbon-carbon unsaturated bond.

6. A thermoplastic resin composition comprising the graft polymer according to claim 4.

7. A film, a sheet, an adhesive resin, a compatibilizer, a resin modifier, a filler dispersant or a dispersed system wherein each comprises the graft polymer according to claim 4.

8. A film, a sheet, an adhesive resin, a compatibilizer, a resin modifier, a filler dispersant or a dispersed system wherein each comprises the thermoplastic resin composition according to claim 6.

* * * * *